(12) United States Patent
Choi et al.

(10) Patent No.: US 11,023,072 B2
(45) Date of Patent: Jun. 1, 2021

(54) ELECTRONIC DEVICE FOR PROVIDING HANDWRITING INPUT FUNCTION AND METHOD OF OPERATING THE SAME

(71) Applicant: Samsung Electronics Co., Ltd., Gyeonggi-do (KR)

(72) Inventors: Yongjun Choi, Gyeonggi-do (KR); Chijeong Choi, Gyeonggi-do (KR); Jaehyeon Kwon, Gyeonggi-do (KR); Hongsup Lee, Gyeonggi-do (KR); Kyungwoo Lim, Gyeonggi-do (KR); Seunga Lee, Gyeonggi-do (KR); Yongsang Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/794,345

(22) Filed: Feb. 19, 2020

(65) Prior Publication Data
US 2020/0264753 A1    Aug. 20, 2020

(30) Foreign Application Priority Data
Feb. 19, 2019  (KR) .................. 10-2019-0018911

(51) Int. Cl.
*G06F 3/041*  (2006.01)
*G06F 3/0354*  (2013.01)
*G06F 3/046*  (2006.01)

(52) U.S. Cl.
CPC ...... *G06F 3/04162* (2019.05); *G06F 3/03545* (2013.01); *G06F 3/046* (2013.01)

(58) Field of Classification Search
CPC .. G06F 3/03545; G06F 3/04162; G06F 3/046; G06F 1/1613; G06F 1/1626;
(Continued)

(56) References Cited

U.S. PATENT DOCUMENTS

| 10,015,303 B2 | 7/2018 | Kim et al. |
| 2014/0085815 A1 | 3/2014 | Filipovic et al. |

(Continued)

FOREIGN PATENT DOCUMENTS

| JP | 2006-127545 A | 5/2006 |
| KR | 10-2015-0032028 A | 3/2015 |

(Continued)

OTHER PUBLICATIONS

International Search Report dated Jun. 15, 2020.

*Primary Examiner* — Nelson M Rosario
(74) *Attorney, Agent, or Firm* — Cha & Reiter, LLC.

(57) ABSTRACT

An electronic device and method are disclosed. The electronic device includes: a housing adapted to couple to a first, second and third cover portion, an antenna in the second cover portion, a power management circuit, a wireless communication circuit, an input sensing circuit, and a control circuit. The control circuit implements the method, including: receiving power from a first external device coupled to the electronic device, driving, by a processor, an input-sensing circuit of the electronic device based on at least a part of the received power, detecting, by the processor, an input of a second external device using the driven input-sensing circuit, and transmitting, by communication circuitry, a signal related to the detected input via the second external device to the coupled first external device.

20 Claims, 25 Drawing Sheets

(58) Field of Classification Search
CPC ...... G06F 1/1632; G06F 1/165; G06F 1/1677; G06F 1/1684; G06F 1/169; G06F 3/01; G06F 3/017; G06F 3/02; G06F 3/0202; G06F 3/04817; G06F 3/0482; G06F 3/04883; G06F 3/04886; G06F 2200/1633; G06F 2200/1634; G06F 2203/04803; G06F 2203/04809; H04B 1/3888; H04M 1/72563; H04M 1/72575; H04M 1/0245

See application file for complete search history.

(56) References Cited

U.S. PATENT DOCUMENTS

2014/0204511 A1* 7/2014 Oh .................. G06F 1/1632
 361/679.01
2015/0229754 A1* 8/2015 Won .................. G06F 3/04886
 455/575.8
2018/0136781 A1 5/2018 Fujioka

FOREIGN PATENT DOCUMENTS

KR 10-2015-0073747 A 7/2015
KR 10-2017-0098124 A 8/2017

* cited by examiner

ELECTRONIC DEVICE FOR PROVIDING HANDWRITING INPUT FUNCTION AND METHOD OF OPERATING THE SAME

CROSS-REFERENCE TO RELATED APPLICATION(S)

This application is based on and claims priority under 35 U.S.C. 119 to Korean Patent Application No. 10-2019-0018911, filed on Feb. 19, 2019, in the Korean Intellectual Property Office, the disclosure of which is herein incorporated by reference in its entirety.

BACKGROUND

1) Field

Certain embodiments relate to an electronic device that provides a handwriting input function and a method of operating the same.

2) Description of Related Art

Due to the remarkable development of information communication technology and semiconductor technology, the distribution and use of various electronic devices are rapidly increasing. In particular, recently developed electronic devices are being developed such that users are capable of communicating with each other while carrying the electronic devices.

For example, electronic devices, such as smart phones, personal computers, and tablet computers, provide various useful functions to users through various applications. Electronic devices are becoming devices that are capable of using various types of information by providing various functions in addition to the voice call function.

In order to allow the variety of user input methods, electronic devices are evolving from a traditional user interface (UI) type, in which a separate component such as a keyboard, a keypad, or a mouse is used, to an intuitive UI type, in which information is input by directly touching a screen using a finger, an electronic pen or the like, or input using voice. For example, a user may perform handwriting on an electronic device using an electronic pen.

The above information is presented as background information only to assist with an understanding of the disclosure. No determination has been made, and no assertion is made, as to whether any of the above might be applicable as prior art with regard to the disclosure.

SUMMARY

In general, an electronic device may sense a magnetic field generated by an electronic pen in order to detect a user's handwriting. For example, electronic devices may include a separate input-sensing module, such as a digitizer pad in order to detect a magnetic field generated by the electronic pen. In this case, there is a problem in that a handwriting input function using an electronic pen cannot be used in an electronic device that does not have a separate input-sensing module, such as a digitizer.

In addition, when an electronic device includes a separate input-sensing module, a problem may occur in that the user is limited to using a designated input tool supported by the input-sensing module. In addition, even if an electronic device includes a separate input-sensing module, there is a problem in that it is not easy to use a handwriting input function because the handwriting input and output information are displayed through a display having a limited size.

Accordingly, certain embodiments provide an accessory device for enabling an electronic device, which does not include a separate input sensing module, to provide a handwriting input function, and a method of operating the accessory device.

In addition, certain embodiments provide an accessory device for supporting various types of input tools for an electronic device having an input-sensing module and for extending a handwriting input area or an output information display area, and a method of operating the accessory device. The technical subjects pursued in the disclosure may not be limited to the above mentioned technical subjects, and other technical subjects which are not mentioned may be clearly understood, through the following descriptions, by those skilled in the art of the disclosure.

An electronic device (e.g., an accessory device) according to certain embodiments may include: a housing adapted to couple to a first cover portion of a first face of a first external device, a second cover portion of a second face of the first external device, and a third cover portion adapted to surround at least a portion of a side face of the first external device and connecting the first cover portion and the second cover portion, an antenna housed in the second cover portion, a power management circuit configured to receive power via the antenna, a wireless communication circuit configured to provide wireless communication using the antenna, an input-sensing circuit disposed in the first cover portion and configured to detect a second external device, and a control circuit disposed in the housing and operatively connected to the power management circuit, the wireless communication circuit, and the input-sensing circuit, wherein the control circuit is configured to supply power received from the first external device to the input-sensing circuit using the power management circuit, and to transmit a signal related to the second external device to the first external device using the communication circuit, the signal generated by the input-sensing circuit.

A method of operating an electronic device according to certain embodiments may include: receiving power from a first external device coupled to the electronic device, driving, by a processor, an input-sensing circuit of the electronic device based on at least a part of the received power, detecting, by the processor, an input of a second external device using the driven input-sensing circuit, and transmitting, by communication circuitry, a signal related to the detected input via the second external device to the coupled first external device.

A first external device according to certain embodiments may include: a housing including a first face, a second face, and a third face surrounding a side face of a first external device, an antenna disposed adjacent to the second face of the housing, a power management circuit configured to control power supplied to another electronic device via the antenna, a wireless communication circuit configured to communicate with the another electronic device using the antenna, and a control circuit disposed in the housing and operatively connected to the power management circuit and the wireless communication circuit, wherein the control circuit is configured to determine whether or not data is received via the wireless communication circuit indicating detecting of the other electronic device, and determine whether power is to be supplied to the other device using the power management circuit based on the determination.

BRIEF DESCRIPTION OF THE DRAWINGS

The above and other aspects, features, and advantages of certain embodiments of the disclosure will be more apparent from the following description taken in conjunction with the accompanying drawings, in which.

In connection with the description of the drawings, the same or similar components may be denoted by the same or similar reference numerals.

DETAILED DESCRIPTION

Hereinafter, certain embodiments of the disclosure will be described in detail with reference to the accompanying drawings. Further, in the following description of the disclosure, a detailed description of known functions and configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Figure 1:
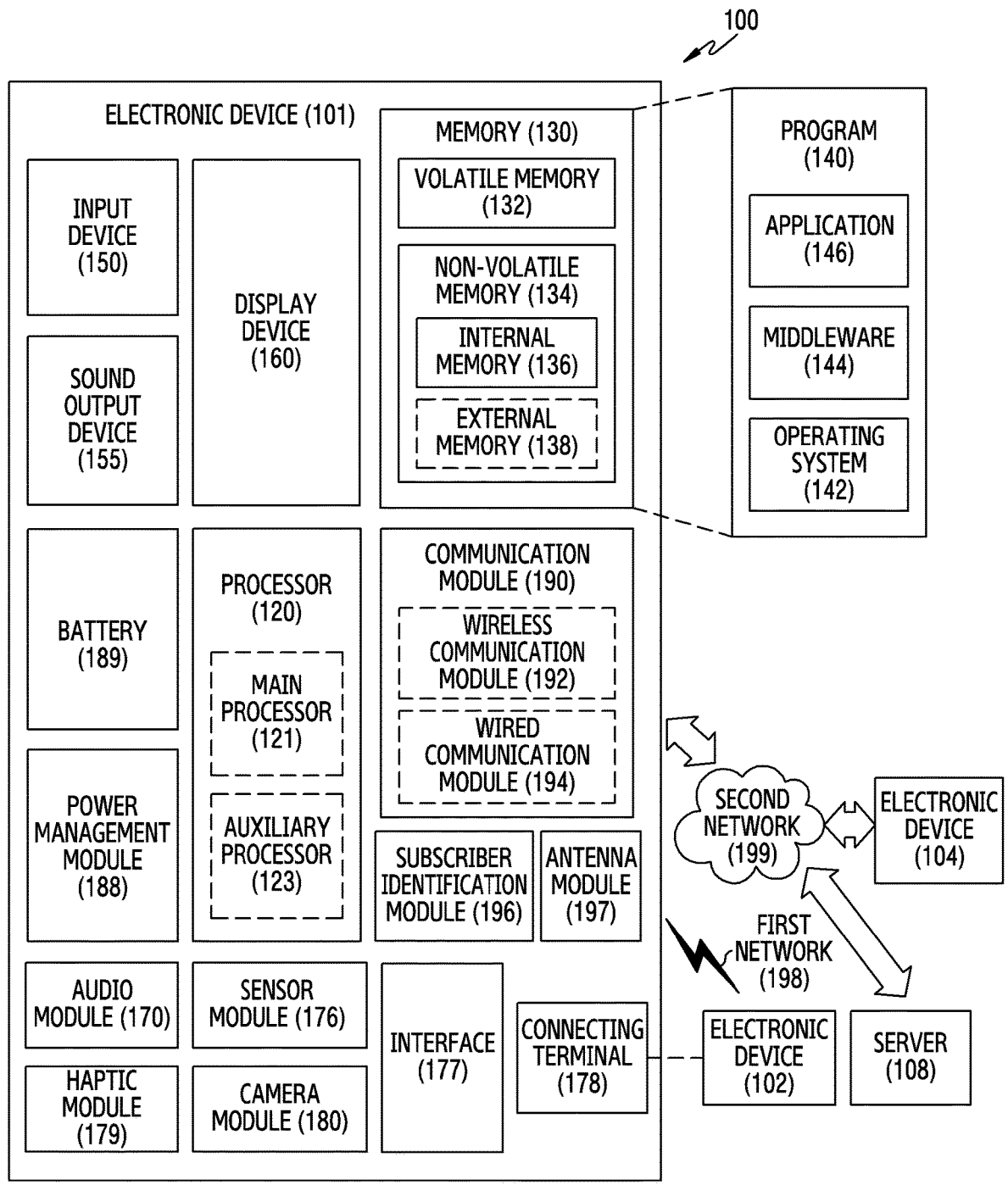
FIG. 1 is a block diagram of an electronic device according to certain embodiments in a network environment.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2A:
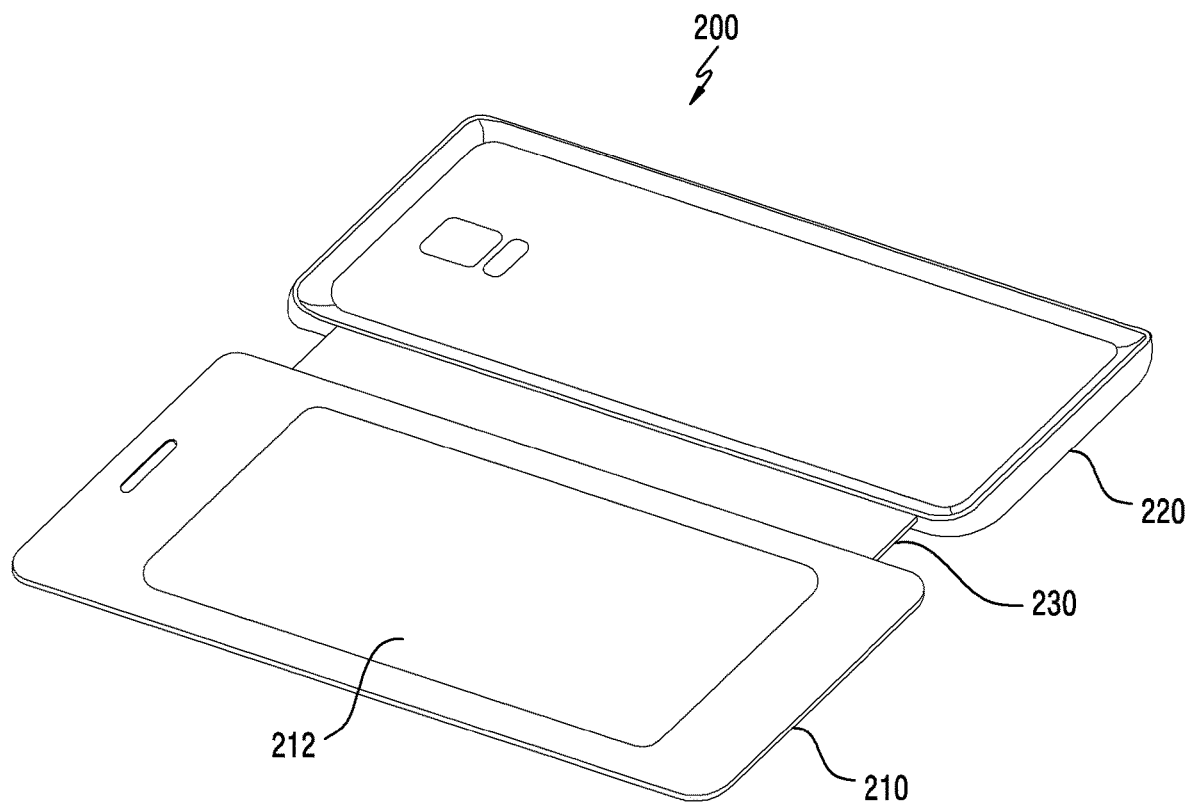
FIG. 2A is a view illustrating an accessory device and a first external device according to certain embodiments.
Figure 2B:
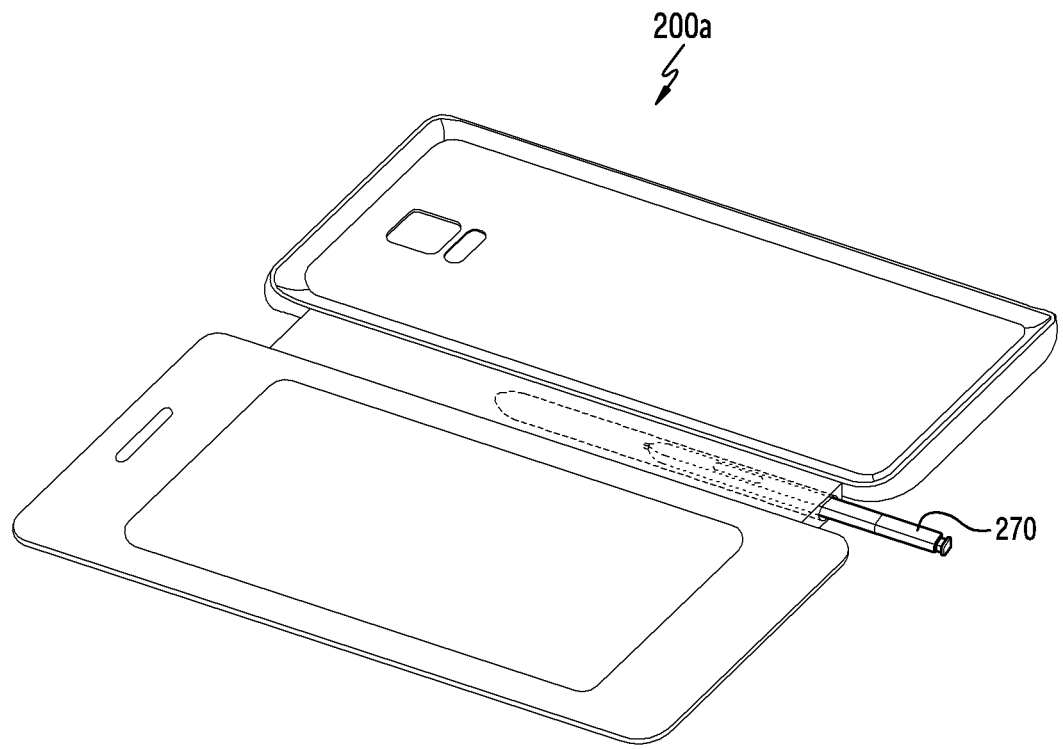
FIG. 2B is a view illustrating an accessory device and a first external device according to certain embodiments.
Figure 2B:
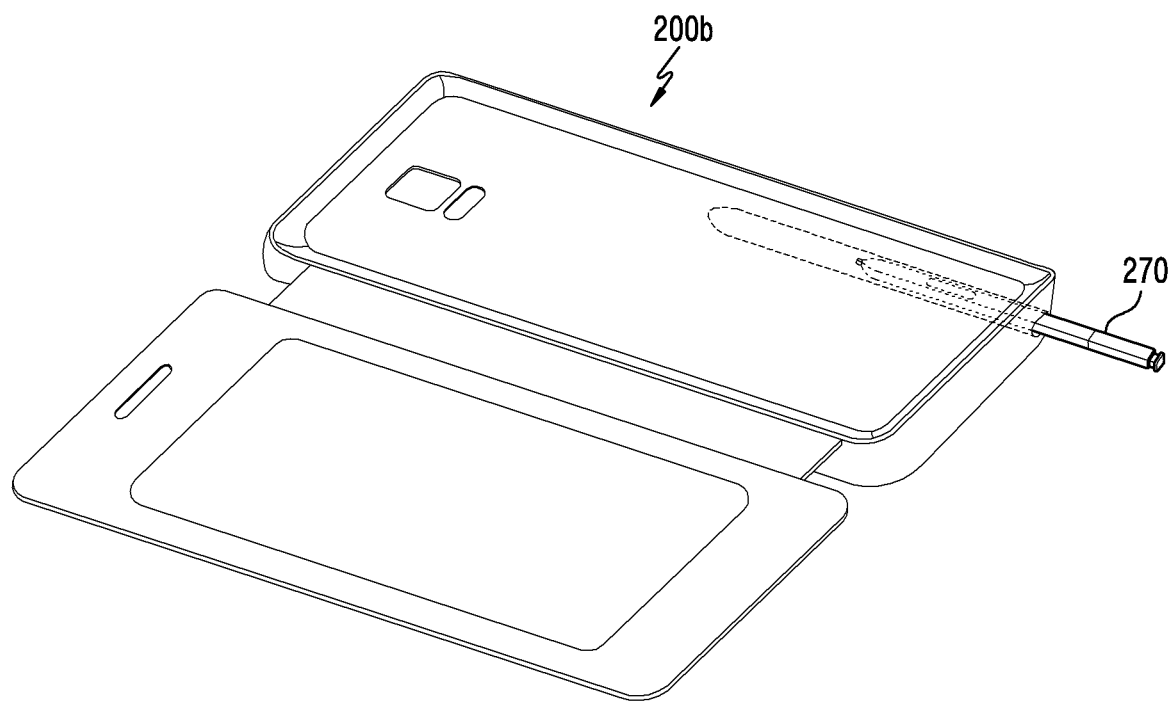
Figure 2C:
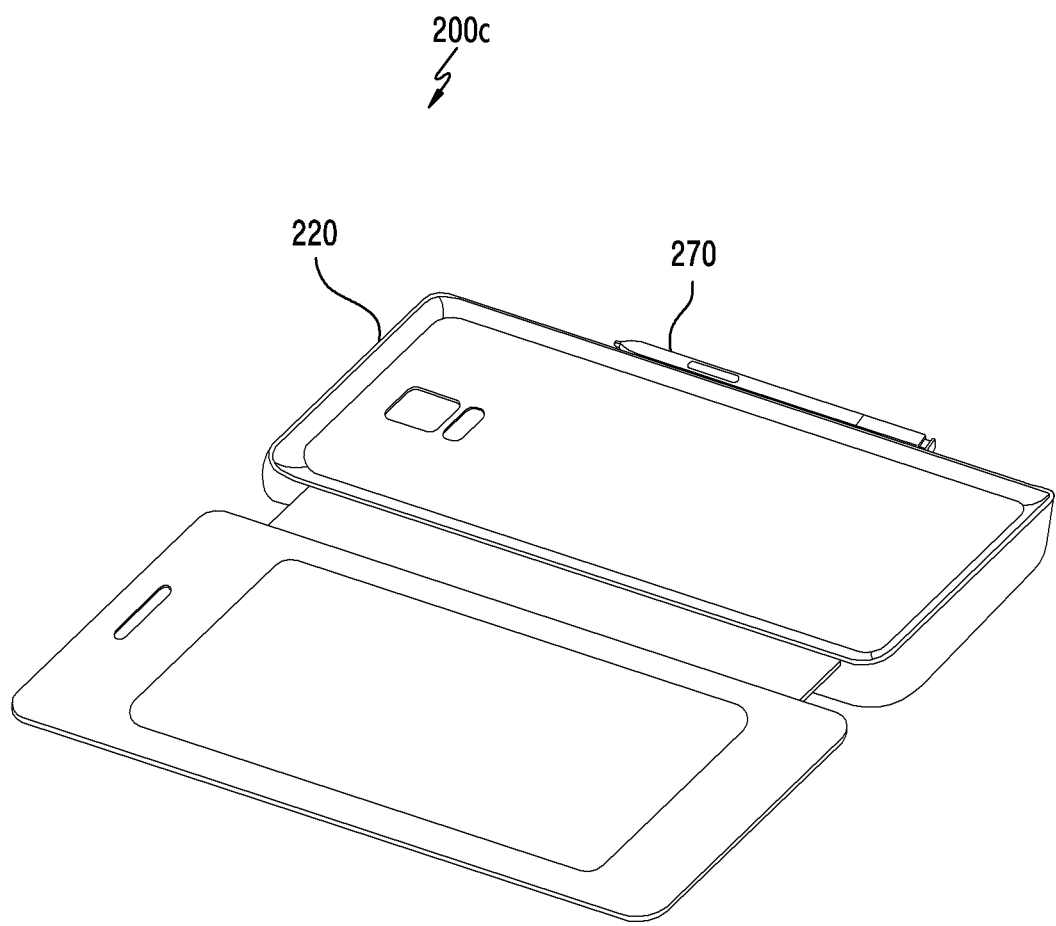
FIG. 2C is a view illustrating an accessory device and a first external device according to certain embodiments.
Figure 2D:
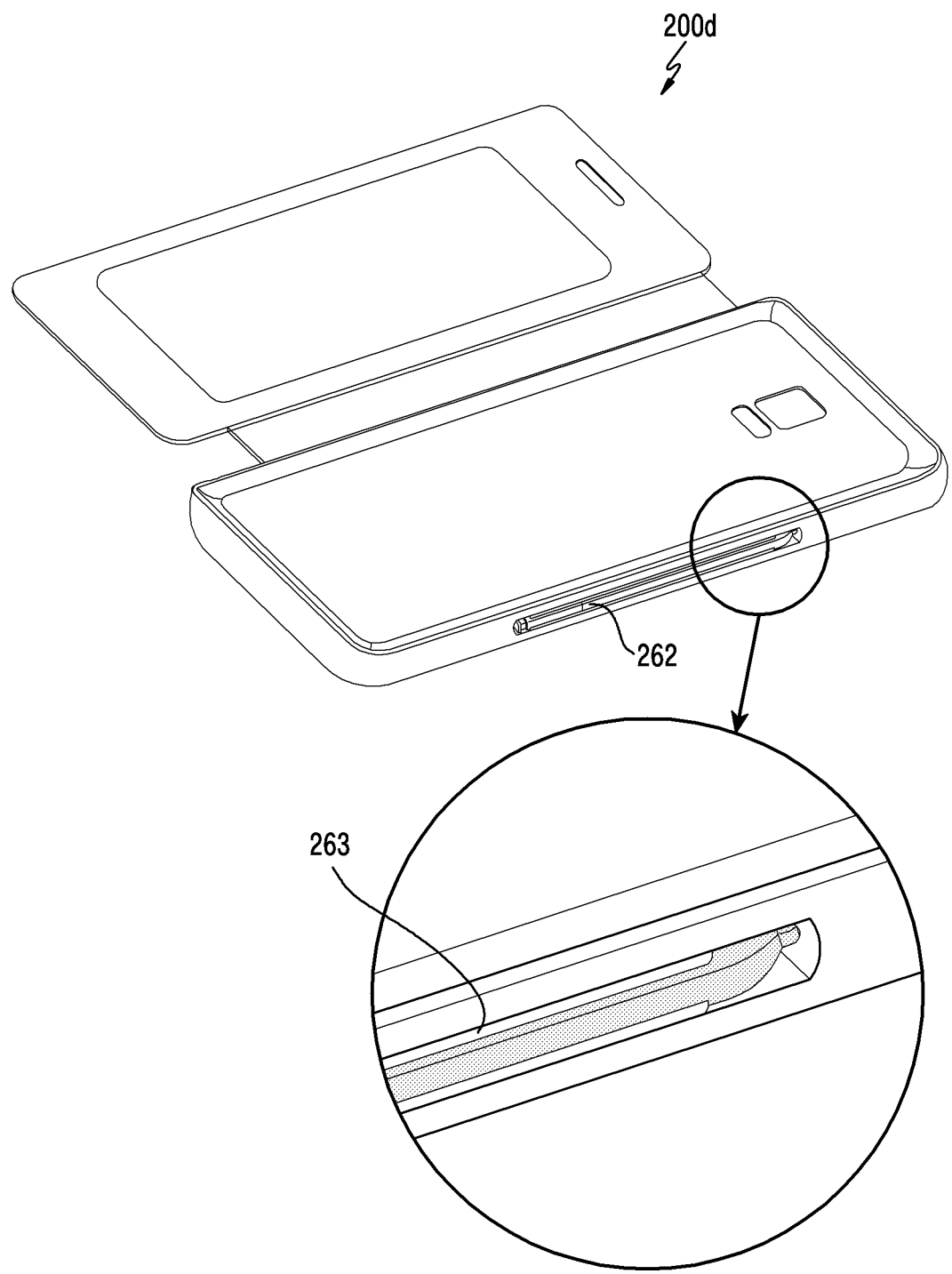
FIG. 2D is a view illustrating an accessory device and a first external device according to certain embodiments.
Figure 2E:
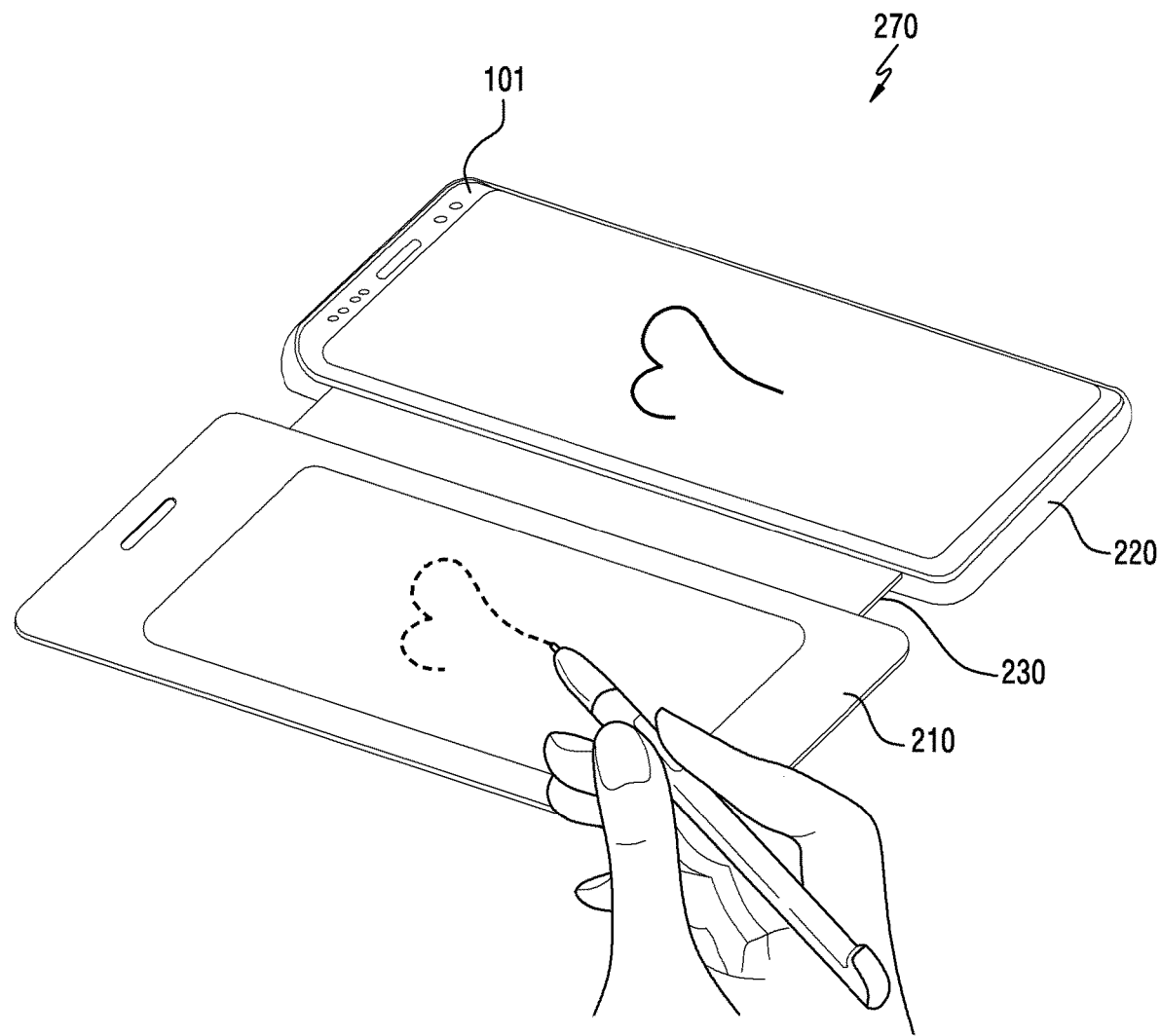
FIG. 2E is a view illustrating an accessory device and a first external device according to certain embodiments.

FIG. 2A is a view illustrating an accessory device and a first external device according to certain embodiments, FIG. 2B is a view illustrating an accessory device and a first external device according to certain embodiments, FIG. 2C is a view illustrating an accessory device and a first external device according to certain embodiments, FIG. 2D is a view illustrating an accessory device and a first external device according to certain embodiments, and FIG. 2E is a view illustrating an accessory device and a first external device according to certain embodiments. The accessory device in FIGS. 2A to 2E may be the electronic device 101 or the electronic device 102 in FIG. 1. For example, the accessory device may include at least some of the components of the electronic device 101 or the electronic device 102.

Referring to FIG. 2A, the accessory device 200 may be a cover device capable of protecting a first external device (e.g., an electronic device) 101. According to an embodiment, the accessory device 200 may include: a first cover portion 210 (e.g., a front cover portion), which may be located on a first face (e.g., a front face) of the first external device 101; a second cover portion 220 (e.g., a rear cover portion), which may be located on a second face (e.g., a rear face) of the first external device 101; and a third cover portion 230 (e.g., a side cover portion), which at least partially encloses the side faces of the first external device 101 and connects the first cover portion 210 and the second cover portion 220.

According to certain embodiments, the accessory device 200 may include an input-sensing module 212 (or an input-sensing circuit) capable of sensing an input of a second external device (e.g., an electronic pen). The input-sensing module 212 may be disposed on at least a portion of the first cover portion 210 of the accessory device 200. For example, the input-sensing module 212 may be disposed inside the first cover portion 210 of the accessory device 200 so as to be in contact with the first face of the first external device 101. However, this is merely an example, and the embodiments are not limited thereto. For example, the input-sensing module 212 may be disposed outside the first cover portion 210. In addition, the input-sensing module 212 may be disposed on at least a portion of the first cover portion 210 or the third cover portion 230 of the accessory device 200.

According to certain embodiments, as illustrated in FIG. 2B, the accessory device 200 may include a second external device (e.g., an electronic pen) 270 configured to generate an input signal via the input-sensing module 212. For example, as indicated by 200a in FIG. 2B, the second external device 270 may be detachably mounted in a pen-receiving groove provided in at least a portion of the third cover portion 230 of the accessory device 200. As another example, as indicated by 200b in FIG. 2B, the second external device 270 may be detachably mounted in a pen-receiving groove provided in at least a portion of the second cover portion 220 of the accessory device 200. As another example, as indicated by 200c in FIG. 2C, the second external device 270 may be mounted on at least a portion of the second cover portion 220 of the accessory device 200 using magnetic attraction. For example, a first magnetic force member may be provided on the outer peripheral surface of the accessory device 200 or inside the accessory device 200, and a second magnetic force member may be provided on the outer periphery of the second external device 270 or inside the second external device 270. For example, the first magnetic member and the second magnetic member may include magnetized materials having different polarities. In this case, one of the first magnetic force member and the second magnetic force member may form a magnetic field, and magnetic attraction may be applied to the other magnetic force member by the magnetic field, whereby the second external device 270 is fixable to the accessory device 200. In the same manner, the second external device 270 may be mounted on at least a portion of the first external device 101 by magnetic attraction. As another example, as indicated by 200d in FIG. 2D, the second external device 270 may be detachably mounted in a pen-receiving groove 262 provided in at least a portion of the second cover portion 220 of the accessory device 200. The pen-receiving groove 262 may be recessed in the longitudinal direction of the second cover portion 220 of the accessory device 200. In addition, the pen-receiving groove 262 may be elastically deformable in a laterally outward direction when the second external device 270 is mounted or detached, and may include a side fixing portion 263 configured to wrap and fix at least a portion of the second external device 270 when the second external device 270 is mounted. However, this is merely an example, and the embodiments are not limited thereto. For example, the second external device 270 may be disposed at various positions (e.g., at least a portion of the first cover portion 210) of the accessory device 200 in various ways.

According to certain embodiments, as illustrated in FIG. 2E, the accessory device 200 may operate in the state of being engaged with (or coupled to) the first external device 101. According to an embodiment, the accessory device 200 may sense input via the second external device 270 in the state of being engaged with the first external device 101. In addition, the accessory device 200 may provide a signal related to the input via the second external device 270 to the first external device 101. In addition, as illustrated in FIG. 2E, the first external device 101 may process the input information of the second external device 270 on the external device to be output or stored based on the signal received from the accessory device 200.

Figure 3A:
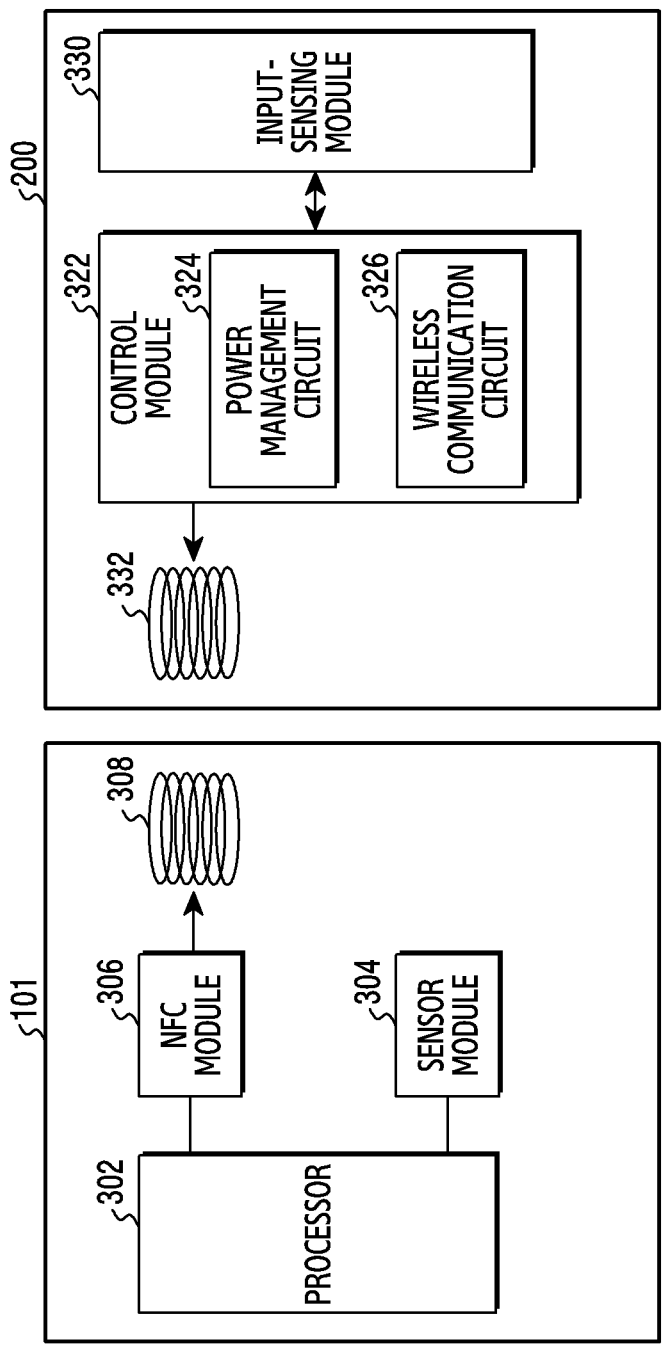
FIG. 3A is an example view for illustrating an accessory device and a first external device according to certain embodiments and FIG. 3B is an example view for illustrating an accessory device and a first external device according to certain embodiments.
Figure 3B:
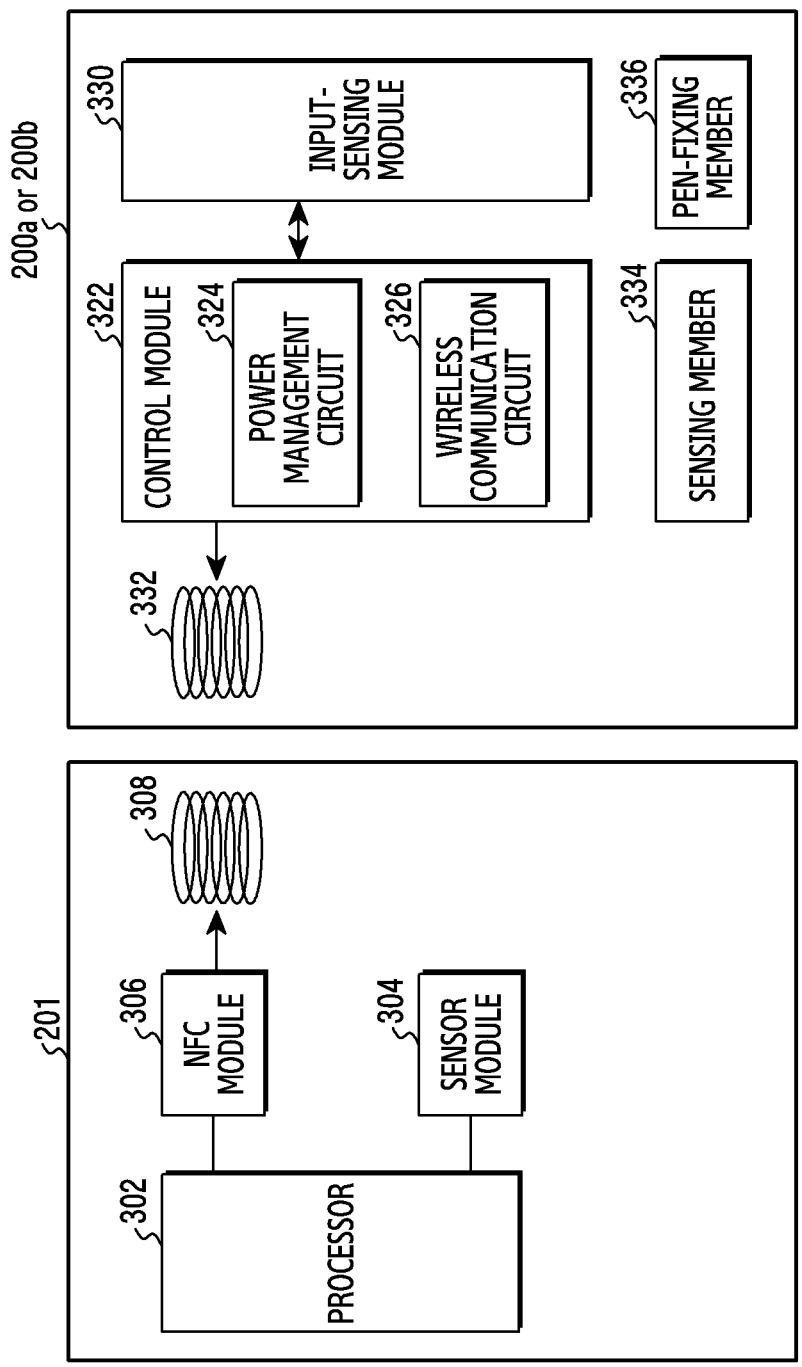

FIG. 3A is an example view for illustrating an accessory device and a first external device according to certain embodiments and FIG. 3B is an example view for illustrating an accessory device and a first external device according to certain embodiments.

Referring to FIGS. 3A and 3B, some components of the first external device may correspond to the electronic device 101 illustrated in FIG. 1. In addition, the accessory device may include at least some components included in the electronic device 101 illustrated in FIG. 1.

According to certain embodiments, as illustrated in FIG. 3A, the first external device (e.g., the electronic device 101) may include an NFC module 306, a processor 302, a sensor module 304, and an NFC antenna 308.

According to an embodiment, the processor 302 of the first external device 101 may sense engagement with the accessory device 200. The engagement may mean that the second cover portion 220 of the accessory device 200 is engaged with the rear face of the first external device 101. According to an embodiment, the processor 302 may sense that the first external device 101 is engaged with the accessory device 200 based on at least some of signals sensed via the sensor module 304. For example, the processor 302 may determine that the first external device 101 is engaged with the accessory device 200 in response to sensing a signal related to the proximity to the first external device 101 via the sensor module 304. As another example, the processor 302 may determine that the first external device 101 is engaged with the accessory device 200 in response to sensing a signal received from the accessory device 200 via the sensor module 304.

According to an embodiment, when it is detected that the first external device 101 is engaged with the accessory device 200, the processor 302 may perform data communication with the accessory device 200. The data communication may include supplying first power to the accessory device 200 such that the accessory device 200 is driven. For example, after supplying the first power to the accessory device 200, the processor 302 may perform an authentication operation for the engaged accessory device 200 through data communication. The authentication operation may be genuine authentication that determines whether or not the engaged accessory device 200 is genuine. For example, the authentication operation may be performed when the engagement of the accessory device 200 is sensed. However, this is merely an example, and certain embodiments are applicable without being limited thereto. For example, the authentication operation may be performed periodically even after the engagement of the accessory device 200 is sensed, or may be performed even when a predetermined event (e.g., charging of the electronic device or power-on/off) is sensed.

For example, in order to perform the authentication operation, the processor 302 may transmit an authentication request signal including the first power to the accessory device 200. For example, the processor 302 may control the NFC module 306 and the NFC antenna 308 to process the authentication request signal to be provided to the accessory device 200. After receiving the authentication request, the accessory device 200 may be operated by the first power to perform an authentication operation, as described below. In addition, when an authentication response signal is received from the accessory device 200, the processor 302 may perform authentication with the accessory device 200 in response to the authentication request signal. The authentication response signal may include authentication information related to the accessory device 200 (e.g., identification information of the accessory device 200), and may be received through the NFC antenna 308 and the NFC module 306. In this embodiment, the authentication operation has been described as an operation of data communication between the first external device 101 and the accessory device 200. However, this is merely an example, and the embodiments are not limited thereto. For example, the authentication operation between the first external device 101 and the accessory device 200 may be omitted. As another example, data communication for transmitting and receiving setting information, event information, operation completion information or the like may be performed.

According to an embodiment, after performing the authentication operation with the accessory device 200, the processor 302 may determine entry into an input information reception mode. The input information reception mode may be a mode for receiving input information provided from the accessory device 101. According to an embodiment, when detecting the user's handwriting situation, the processor 302 may determine that conditions for entry into the input information reception mode are satisfied. The user's handwriting situation may include a state in which the first cover portion 210 and the second cover portion 220 of the accessory device 200 are unfolded, and a state in which the second external device 270 inserted into the first external device 101 is removed from stowage in the first external device 101 (e.g., "drawn out", or unstowed).

According to an embodiment, after determining the entry into the input information reception mode, the processor 302 may perform a process such that the first external device 101 operates in the input information reception mode. For example, while the first external device 101 operates in the input information reception mode, the processor 302 may provide second power to the accessory device 200. For example, the amount of second power transmitted during the operation in the input information reception mode may be higher than the amount of first power transmitted for authentication with the accessory device 200. However, this is merely an example, and certain embodiments are applicable without being limited thereto. For example, the amount of first power transmitted for authentication with the accessory device 200 and the amount of second power transmitted during the operation in the input information reception mode may be the same.

According to certain embodiments, the accessory device 200 may include a control module 322 (or a control circuit), an input-sensing module 330 (e.g., an input-sensing module 212), and an antenna 332 (e.g., an NFC antenna).

According to an embodiment, the control module 322 of the accessory device 200 may perform a process such that data communication is performed with the first external device 101. As described above, data communication may include receiving first power from the first external device 101. For example, the control module 322 may perform an authentication operation with the first external device 101 based on the received first power. The authentication operation may be performed in response to reception of the authentication request signal received through the antenna 332. As described above, the authentication request includes the first power provided by the first external device 101, and may be received through the antenna 332 and a wireless communication circuit 326 of the accessory device 200. For example, the control module 322 may be operated by the first power included in the authentication request, and may transmit an authentication response signal including authentication information to the first external device 101 via the wireless communication circuit 326 and the antenna 332 in response to the authentication request signal.

According to an embodiment, after performing data communication, for example, an authentication operation, with the first external device 101, the control module 322 may determine whether or not entry into the handwriting input mode is performed (or whether or not the input-sensing module is activated). The handwriting input mode may be a mode in which the accessory device 200 engaged with the first external device 101 senses input via the second external device 270 and stores or outputs the sensed input through the first external device 101. According to an embodiment, when detecting the user's handwriting situation, the control module 322 may determine that conditions for entry into the input information reception mode are satisfied. For example, when it is determined that the first cover portion 210 and the second cover portion 220 are in the unfolded state, the control module 322 may determine that the user's handwriting situation is estimated. For example, the control module 322 may receive information indicating the unfolded state of the first cover portion 210 and the second cover portion 220 from the first external device 101. According to another embodiment, the handwriting situation of the user may be determined based on the state of the second external device 270. For example, when it is determined that the second external device 270 inserted into the first external device 101 is drawn out from the first external device 101, the control module 322 may determine that the user's handwriting situation is estimated. For example, the control module 322 may receive information indicating the unfolded state of the second external device 270 from the first external device 101 or the second external device 270. As another example, the user's handwriting situation may be determined based on the state of the accessory device 200 and the state of the second external device 270. For example, when the first cover portion 210 and the second cover portion 220 are in the unfolded state and drawing-out of the second external device 270 is sensed, the control module 322 may determine that the user's handwriting situation is estimated. In this embodiment, a description has made of a configuration in which the accessory device 200 determines whether or not entry into the handwriting input mode is performed based on the information received from the first external device 101 or the second external device 270. However, this is merely an example, and certain embodiments are applicable without being limited thereto. For example, as will be described later with reference to FIG. 3B, the control module 322 may determine whether or not entry into the handwriting input mode is performed based on at least some of signals sensed via the sensing member 334 (e.g., a sensor module) provided in the accessory device 200.

According to an embodiment, when it is determined that conditions for entry into the handwriting input mode are satisfied, the control module 322 may receive second power provided from the first external device 101 via the antenna 332 and the wireless communication circuit 326, and may provide the received second power to the input-sensing module 330. For example, the control module 322 may control the power management module 324 such that the received second power is provided to the input-sensing module 330. According to an embodiment, the input-sensing module 330 may be operated by the second power, and may recognize input via the second external device 270. For example, the input-sensing module 330 may include a digitizer pad capable of sensing a magnetic field applied from the second external device 270. However, this is merely an example, and embodiments are not limited thereto. For example, the input-sensing module 330 may sense the second external device 270 in various manners, such as a capacitive manner, a pressure-sensitive manner, an infrared manner, and an ultrasonic manner.

In addition, during operation in the handwriting input mode, the control module 322 may provide information (or a signal) related to input via the second external device 270 to the first external device 101. For example, the information related to the input provided to the first external device 101 may include information related to the position and intensity of a magnetic field sensed by the input-sensing module 330, and the information may be provided to the first external device 101 via the wireless communication circuit 326 and the antenna 332.

The accessory device 200 described above has been described as having a configuration that includes a single antenna 332. However, this is merely an example, and certain embodiments are applicable without being limited thereto. For example, the accessory device 200 may include a plurality of antennas. For example, the accessory device 200 may include a first antenna that receives power from the first external device 101 and a second antenna that transmits and receives data to and from the first external device 101. In addition, at least one function or operation performed by the first antenna and at least one function or operation performed by the second antenna may be shared. For example, at least one function or operation performed by the first antenna may be performed by the second antenna, and at least one function or operation performed by the second antenna may be performed by the first antenna.

As described above with reference to FIG. 2A, the accessory device 200 described above with reference to FIG. 3A may be implemented in a form that does not include a separate second external device 270. In addition, according to certain embodiments, as described above with reference to FIGS. 2B to 2D, the accessory device 200 may include the second external device 270. In this case, as illustrated in FIG. 3B, the accessory device 200 may further include a sensing member 334 and a pen-fixing member 336, in contrast with the configuration of the accessory device 200 illustrated in FIG. 3A.

According to an embodiment, the pen-fixing member 336 may enable the second external device 101 to be coupled to the accessory device 200. For example, as described above with reference to FIG. 2B, the second external device 101 may be inserted into or drawn out from a pen-receiving groove provided in at least a portion of the accessory device 200. For example, the pen-fixing member 336 may include a pen-receiving groove corresponding to the external shape of the second external device 270. As another example, as described above with reference to FIG. 2C, the second external device 270 may be mounted on at least a portion of the first external device 101 or the accessory device 200 by magnetic attraction. As another example, as described above with reference to FIG. 2D, the second external device 270 may be fixed by a side fixing portion 263 included in the recessed shape in the longitudinal direction of the second cover portion 220 of the accessory device 200. According to an embodiment, at least a part of the second power supplied from the first external device 101 may be provided to the pen-fixing member 336. For example, the second external device 270, which is in the inserted state, may use at least a part of the received second power as charging current.

According to an embodiment, the sensing member 334 may determine whether the second external device 101 is in the inserted state or the drawn-out state. For example, the second sensing member 334 may include at least one sensor (e.g., the sensor module 276).

The accessory device 200a or 200b in FIG. 3B may perform operations similar to those of the accessory device 200 in FIG. 3A, but may perform operations somewhat different from those of the accessory device 200 in FIG. 3A in terms of determining the user's handwriting situation.

According to an embodiment, the control module 322 of the accessory device 200a or 200b may sense whether the second external device 270 inserted into or mounted on the accessory device 200a or 200b is drawn out or detached from the accessory device 200a or 200b. For example, the control module 322 may sense the drawing-out of the second external device 270 based on at least some of signals sensed via the second sensing member 334, and based on this, may determine that the user's handwriting situation is estimated.

For example, the control module 322 may sense an input of a third input device (not illustrated) in the state in which the second external device 270 is inserted into or mounted on the pen-fixing-member 336, and, based thereon, may determine that the user's handwriting situation is estimated. The third external device may be an external device (e.g., an electronic pen) that is the same as or similar to the second external device 270, and may be a component of the first external device 101.

Figure 3C:
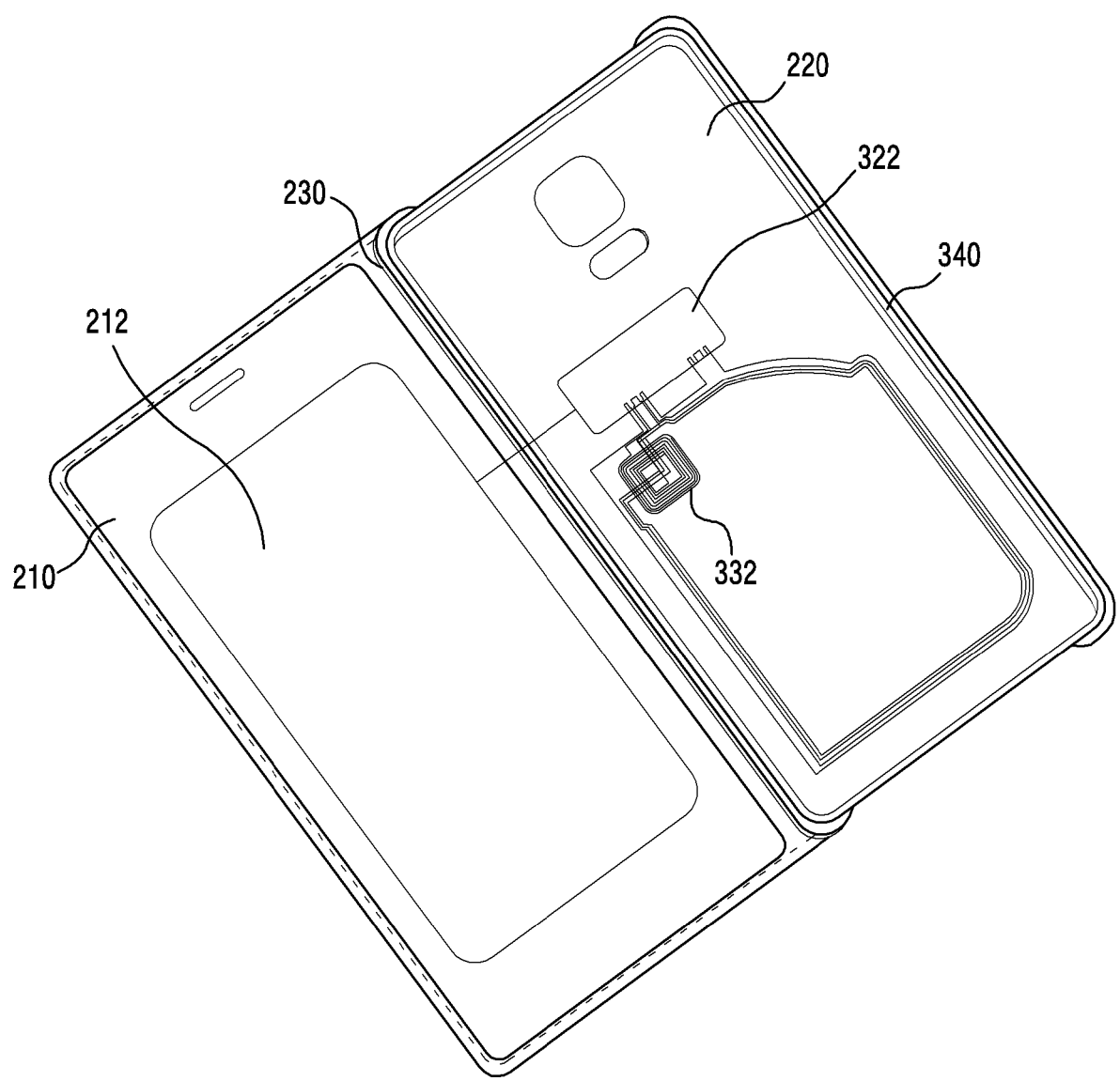
FIG. 3C is a plan view of an accessory device according to certain embodiments.

FIG. 3C is a plan view of an accessory device according to certain embodiments.

Referring to FIG. 3C, an accessory device 200 according to certain embodiments may include a housing. The housing may include a first face 210 (e.g., a first cover portion 210) that faces in the first direction, a second face 220 (e.g., a second cover portion 220) that faces in a second direction opposite the first direction, and a third face 230 (e.g., a third cover portion 230) that surrounds a portion of the space between the first face 210 and the second face 220.

According to certain embodiments, the accessory device 200 may include a connection member 340 configured to detachably connect the housing of the accessory device 200 to a first external electronic device (e.g., the electronic device 101). The connection member 340 may be disposed on at least a portion of the second face 220. For example, the connection member 340 may be configured to surround the side faces of the first external device 101. According to certain embodiments, the accessory device 200 may be manufactured in a form that covers a portion of the rear face (e.g., a face opposite the face in which the display device 160 of the first external device 101 is exposed) or a side face of the housing of the first external device 101, and may be coupled to the first external device 101.

According to certain embodiments, an input-sensing module 212 electrically connected to the control module 322 may be disposed on the first face 210. According to certain embodiments, although not illustrated, a sensing member (e.g., the sensing member 334) may be disposed in at least a portion of the first surface 210 to sense the opening or closing of the first face (e.g., the first cover portion 210).

According to certain embodiments, an antenna having a conductive pattern may be disposed inside the second face 220 to receive data and power of a radio-frequency signal from the first external device 101. However, this is merely an example, and certain embodiments are applicable without being limited thereto. For example, a first antenna having a first conductive pattern for receiving data of a radio-frequency signal and a second antenna having a second conductive pattern for receiving wireless power from the first external device 101 may be included inside the second face 220. According to certain embodiments, a control module 322 electrically connected to at least one antenna may be disposed inside the second surface 220.

An electronic device (e.g., the accessory device 200) according to certain embodiments may include: a housing including a first cover portion capable of being located on a first face of a first external device (e.g., the external device 101), a second cover portion capable of being located on a second face of the first external device, and a third cover portion surrounding at least a portion of a side face of the first external device and connecting the first cover portion and the second cover portion; an antenna housed in the second cover portion; a power management circuit configured to receive power via the antenna; a wireless communication circuit configured to provide wireless communication using the antenna; an input-sensing circuit housed in the first cover portion so as to recognize a second external device; and a control circuit housed in the housing and operatively connected to the power management circuit, the wireless communication circuit, and the input-sensing circuit. The control circuit may be configured to supply the power supplied from the first external device to the input-sensing circuit using the power management circuit and to transmit a signal related to the second external device and generated by the input-sensing circuit to the first external device using the communication circuit.

According to an embodiment, the control circuit may be configured to supply the power supplied from the first external device to the input-sensing circuit based on at least one of an opened state of the accessory device or a drawn-out state of the second external device.

According to an embodiment, the electronic device may further include an accommodation groove configured to detachably mount the second external device therein, and at least one sensing member operatively connected with the accommodation groove. The control circuit may be configured to identify drawing-out of the second external device inserted into the accommodation groove, based on at least some of signals acquired via the at least one sensing member.

According to an embodiment, the control circuit may be configured to identify drawing-out of the second external device inserted into the first external device based on at least some of signals acquired via the first external device.

According to an embodiment, the control circuit may be configured to acquire additional information related to the second external device while transmitting a signal related to the second external device to the first external device and to change a handwriting parameter based on the acquired additional information, and the handwriting parameter may include at least one of a drawing mode, an erasing mode, an input cancel mode, or an input repeat mode.

According to an embodiment, the control circuit may be configured to stop supplying power to the input-sensing circuit in response to sensing a deactivation event for the input-sensing circuit, and the deactivation event may include at least one of disengagement from the external device, closing of the accessory device, or insertion of the second external device.

According to an embodiment, the control circuit may be configured to notify the first external device of activation of the input-sensing module after supplying the power, supplied from the first external device, to the input-sensing circuit.

According to an embodiment, the control circuit may be configured to provide information requesting to lower the supplied power to a predetermined level in response to sensing the deactivation event.

According to an embodiment, the control circuit may be configured to sense a state change of an accessory related to the electronic device after transmitting a signal related to the second external device to the first external device, and to transmit a processing signal for processing the signal transmitted to the first external device in a predetermined manner to the first external device based on the state change.

According to an embodiment, the accessory may include an inductance component for changing an electrical parameter, and the electronic device may further include a detection member configured to detect an inductance component.

According to an embodiment, the accessory may include a magnetic component, and the electronic device may further include a detection member configured to detect a magnetic field component.

According to an embodiment, the accessory may include an adhesive sheet.

A first external device (e.g., the external device 101) according to certain embodiments may include: a housing including a first face, a second face, and a third face surrounding a side face of a first external device; an antenna disposed adjacent to the second face of the housing; a power management circuit configured to control power supplied to another electronic device (e.g., the accessory device 200) via the antenna; a wireless communication circuit configured to communicate with the another electronic device using the antenna; and a control circuit housed in the housing and operatively connected to the power management circuit and the wireless communication circuit. The control circuit may be configured to determine whether or not data informing the another electronic device of sensing of input is received via the wireless communication circuit, and to determine power supplied to the another device using the power management circuit depending on whether or not data informing the another electronic device of sensing of input is received.

Figure 4:
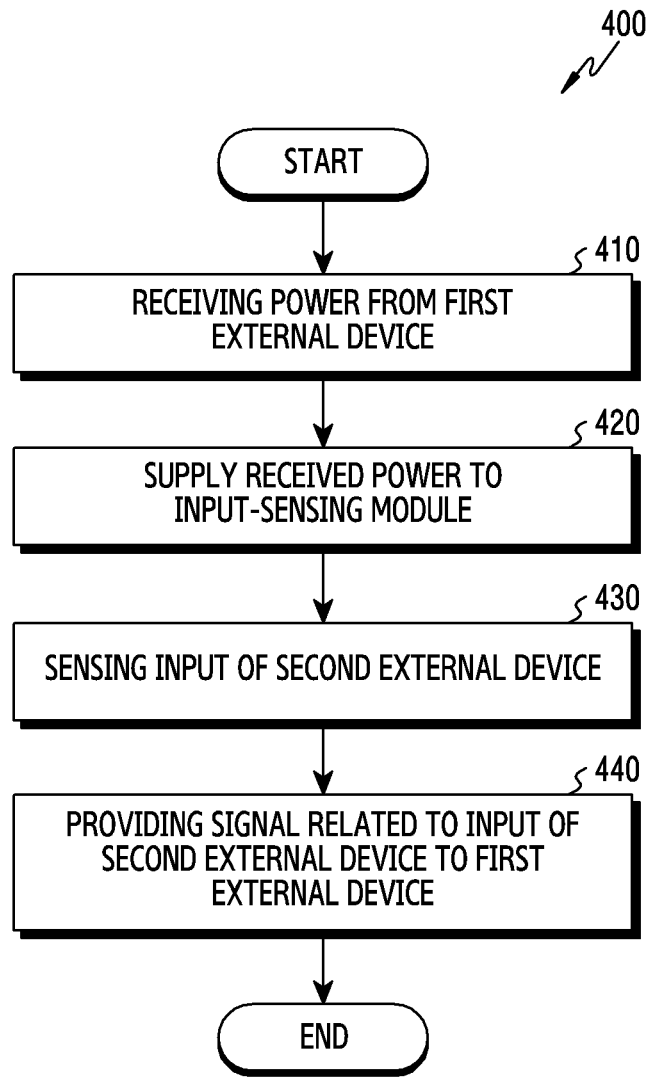
FIG. 4 is a flowchart for providing a handwriting input function in an accessory device according to certain embodiments.

FIG. 4 is a flowchart for providing a handwriting input function in an accessory device (400) according to certain embodiments. In the following embodiments, respective operations may be performed sequentially, but are not necessarily performed sequentially. For example, the order of respective operations may be changed, and at least two operations may be performed in parallel.

Referring to FIG. 4, according to certain embodiments, the accessory device 200 (e.g., the control module 322 in FIGS. 3A and 3B) may receive power from a first external device (e.g., the electronic device 101) in operation 410. According to an embodiment, the control module receives power using NFC communication in the state in which the accessory device 200 is engaged with the first external device 101. For example, an induced current is generated in the antenna 332 of the accessory device 200 by the power signal received from the first external device 101, and the control module 322 may operate based on the induced current.

According to certain embodiments, the accessory device 200 (e.g., the control module 322 in FIGS. 3A and 3B) may provide at least some of received power to the input-sensing module 330 in operation 420. For example, as described above, the input-sensing module 330 may include a digitizer pad capable of sensing a magnetic field applied from the second external device 270. As described above, the input-sensing module 330 may sense the second external device 270 in various manners such as a capacitive manner, a pressure-sensitive manner, an infrared manner, and an ultrasonic manner. According to an embodiment, the control module 322 may perform a process so as to enter the handwriting input mode for sensing input via the second external device 270.

According to certain embodiments, the accessory device 200 (e.g., the control module 322 in FIGS. 3A and 3B) may sense input via the second external device 270 in operation 430. For example, the control module 322 may sense, via the input-sensing module 330, the second external device 270 in various manners such as a capacitive manner, a pressure-sensitive manner, an infrared manner, and an ultrasonic manner.

According to certain embodiments, in operation 440, the accessory device 200 (e.g., the control module 322 in FIGS. 3A and 3B) may provide a signal related to the input via the second external device 270 to the first external device 101. According to an embodiment, the control module 322 may sense a magnetic field generated by the second external device 270 via the input-sensing module 330, and may transmit at least one of information related to the position of the sensed magnetic field and information related to the intensity of the sensed magnetic field to the first external device 101.

Figure 5:
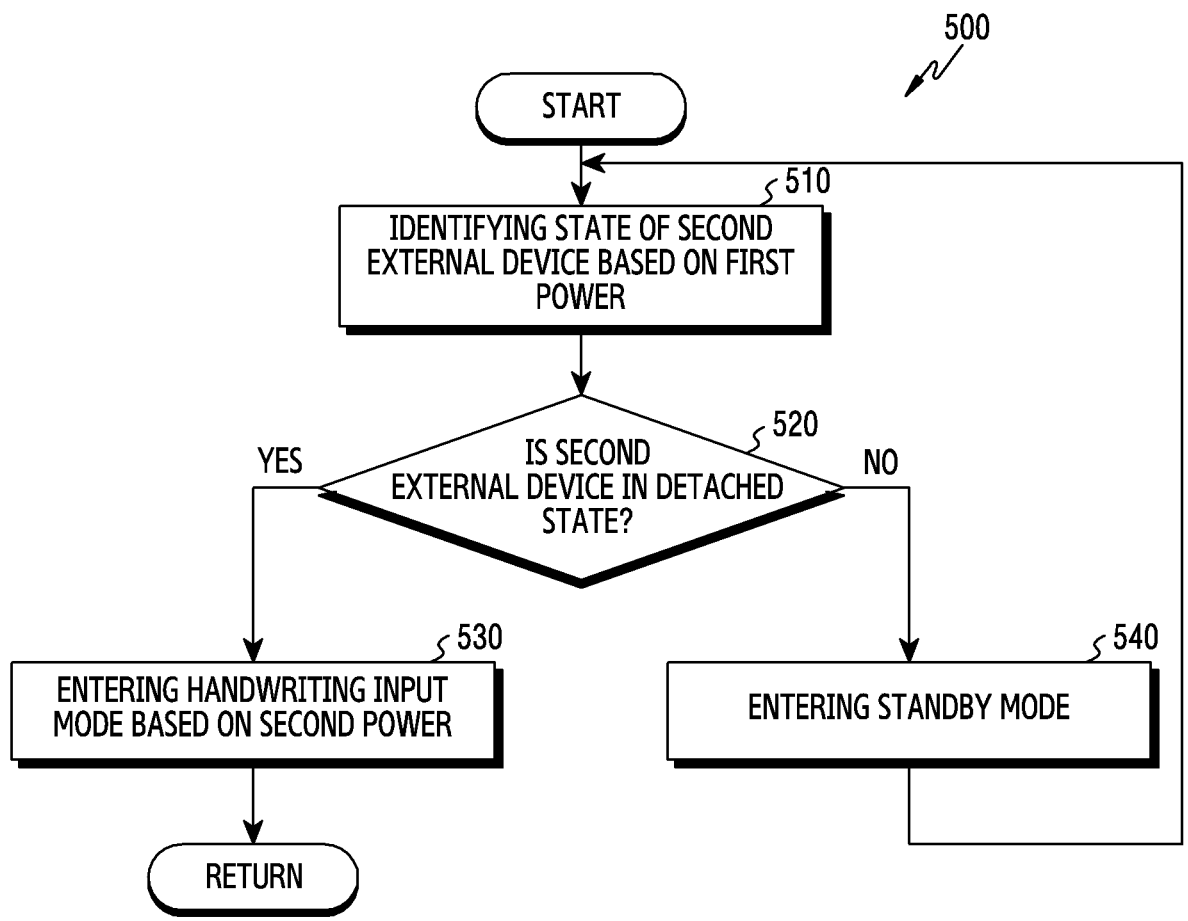
FIG. 5 is a flowchart for controlling received power in an accessory device according to certain embodiments.

FIG. 5 is a flowchart for controlling received power in an accessory device (500) according to certain embodiments. The operations of FIG. 5 described below may correspond to certain embodiments of operation 420 in FIG. 4. In the following embodiments, respective operations may be performed sequentially, but are not necessarily performed sequentially. For example, the order of respective operations may be changed, and at least two operations may be performed in parallel.

Referring to FIG. 5, according to certain embodiments, the accessory device 200 (e.g., the control module 322 in FIGS. 3A and 3B) may perform an operation of identifying the state of the second external device 270 in operation 510, based on the first power supplied from the first external device 101. According to an embodiment, the state of the second external device 270 may include the state in which the second communication device 270 is drawn out (detached) from the accessory device 200 or the first external device 101. For example, the second external device 270 may be a part of the first external device 101, as described above with reference to FIG. 3A. In this case, the control module 322 may identify the state of the second external device 270 by receiving a signal indicating the drawing-out of the second external device 270 from the first external device 101 or the second external device 270. As another example, the second external device 270 may be a part of the accessory device 200, as described above with reference to FIG. 3B. In this case, the control module 322 may receive a signal sensed via the sensing member 334 of the accessory device 200, and may identify the state of the second external device 270 based on the received signal.

According to certain embodiments, in operation 520, the accessory device 200 (e.g., the control module 322 in FIGS. 3A and 3B) may identify a result of the identification operation and determine whether the second external device is in a detached stage.

According to certain embodiments, in response to determining that the second external device 270 is in the drawn-out state, in operation 530, the accessory device 200 (e.g., the control module 322 in FIGS. 3A and 3B) may enter the handwriting input mode based on second power received from the first external device 101. For example, the control module 322 may supply the power received from the first external device 101 to the input control module 330.

According to certain embodiments, in response to determining that the second external device 270 is in the inserted state, in operation 540, the accessory device 200 (e.g., the control module 322 in FIGS. 3A and 3B) may perform a predetermined operation. The predetermined operation may include entering a standby mode. For example, the standby mode may be a mode of supplying the received power to some of the components (e.g., the control module 322) of the accessory device 200 (e.g., but not others). According to an embodiment, the performing of the predetermined operation may include an event-processing operation. For example, when the accessory device 200 includes a display device (e.g., the display device 160), the control module 322 may receive information on an event generated from the first external device 101 (e.g., call reception, text reception, power key input, music reproduction, alarm, schedule notification, etc.), and may output the received information on the event through a display device.

With reference to FIG. 5, a description has been made of an embodiment in which the accessory device 200 is in the opened state and enters the handwriting input mode in the state in which the second external device 270 is drawn out. However, this is merely an example, and certain embodiments are applicable without being limited thereto. For example, the control module 322 may enter the handwriting input mode in response to determining that the accessory device 200 is in the opened state. As another example, the control module 322 may enter the handwriting input mode even when the accessory device 200 is in the closed state but the second external device 270 is drawn out.

Figure 6:
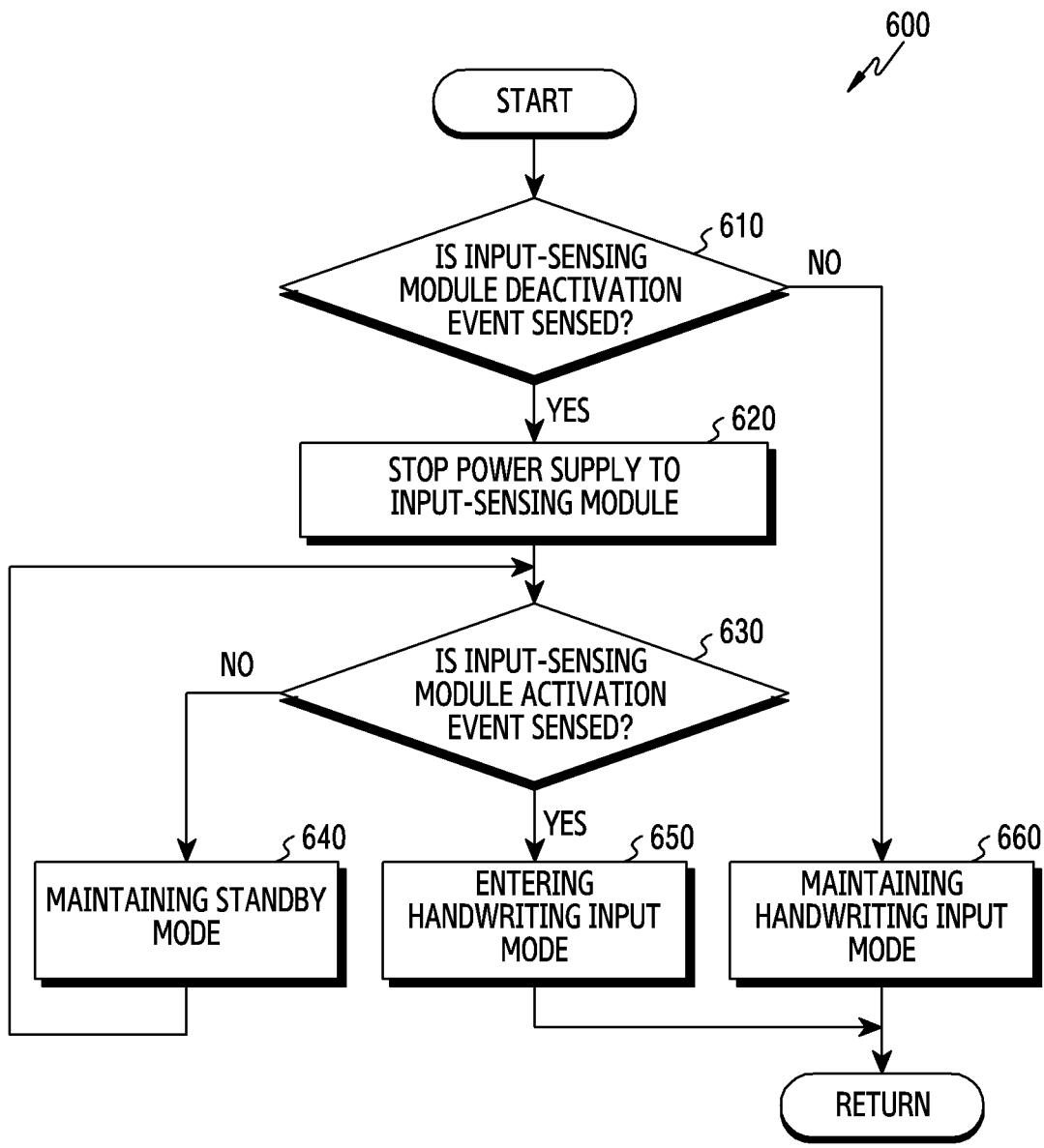
FIG. 6 is a flowchart for providing a handwriting input mode in an accessory device according to certain embodiments.

FIG. 6 is a flowchart for controlling a handwriting input mode in an accessory device (600) according to certain embodiments. The operations of FIG. 5 described below may correspond to certain embodiments of operation 430 and operation 440 in FIG. 4. In the following embodiments, respective operations may be performed sequentially, but are not necessarily performed sequentially. For example, the order of respective operations may be changed, and at least two operations may be performed in parallel.

Referring to FIG. 6, according to certain embodiments, in operation 610, the accessory device 200 (e.g., the control module 322 in FIGS. 3A and 3B) may determine whether or not an input-sensing module deactivation event is sensed.

The deactivation event may be associated with the termination of the handwriting input mode. For example, the control module 322 may determine disengagement between the accessory device 200 and the first external device 101 as sensing of the deactivation event. As another example, when the accessory device 200 is switched from the opened state into the closed state, the control module 322 may determine this to be a deactivation event. As another example, when the second external device 270 is switched from the drawn-out state into the inserted or mounted state, the control module 322 may determine this to be a deactivation event.

According to certain embodiments, when no deactivation event is sensed, in operation 660, the accessory device 200 (e.g., the control module 322 in FIGS. 3A and 3B) may maintain the handwriting input mode. According to an embodiment, the control module 322 may maintain power supply (e.g., second power) to the input-sensing module 330 such that the operation of the input-sensing module 330 is maintained. In addition, the control module 322 may provide, to the first external device 101, at least one of information related to the position of a magnetic field, which is generated by the second external device 270 and sensed via the input-sensing module 330, and information related to the intensity of the magnetic field.

According to certain embodiments, when a deactivation event is sensed, in operation 620, the accessory device 200 (e.g., the control module 322 in FIGS. 3A and 3B) may stop power supply to the input-sensing module 330. However, this is merely an example, and certain embodiments are applicable without being limited thereto. For example, the control module 322 may control the input-sensing module 330 to operate in a low-power mode. For example, the control module 322 may lower the amount of power supplied to the input-sensing module 330 to a predetermined level. According to an embodiment, the control module 330 may provide information for requesting to lower the amount of power supplied to the first external device 101 to a predetermined level.

According to certain embodiments, in operation 630, the accessory device 200 (e.g., the control module 322 in FIGS. 3A and 3B) may determine whether or not an activation event of the input-sensing module 330 is sensed. The activation event may be associated with entry into the handwriting input mode. For example, when the accessory device 200 and the first external device 101 are engaged with each other, the control module 322 may determine this to be sensing of the activation event. As another example, when the accessory device 200 is switched from the closed state into the opened state, the control module 322 may determine this to be an activation event. As another example, when the inserted or mounted second external device is drawn out or detached, the control module 322 may determine this to be an activation event.

According to certain embodiments, when no activation event is sensed, in operation 640, the accessory device 200 (e.g., the control module 322 in FIGS. 3A and 3B) may maintain the standby mode. According to an embodiment, as described above, the control module 322 may control power supply to the input-sensing module 330 so as to perform a process such that the input-sensing module 330 is deactivated or the input-sensing module 330 is operated in a low-power mode.

According to certain embodiments, when an activation event is sensed, in operation 650, the accessory device 200 (e.g., the control module 322 in FIGS. 3A and 3B) may enter the handwriting input mode. For example, the control module 322 may supply power (e.g., the second power) received from the first external device 101 to the input control module 330. In addition, the control module 322 may sense input via the second external device 270, and may provide a signal related to the sensed input via the second external device 270 to the first external device 101.

Figure 7:
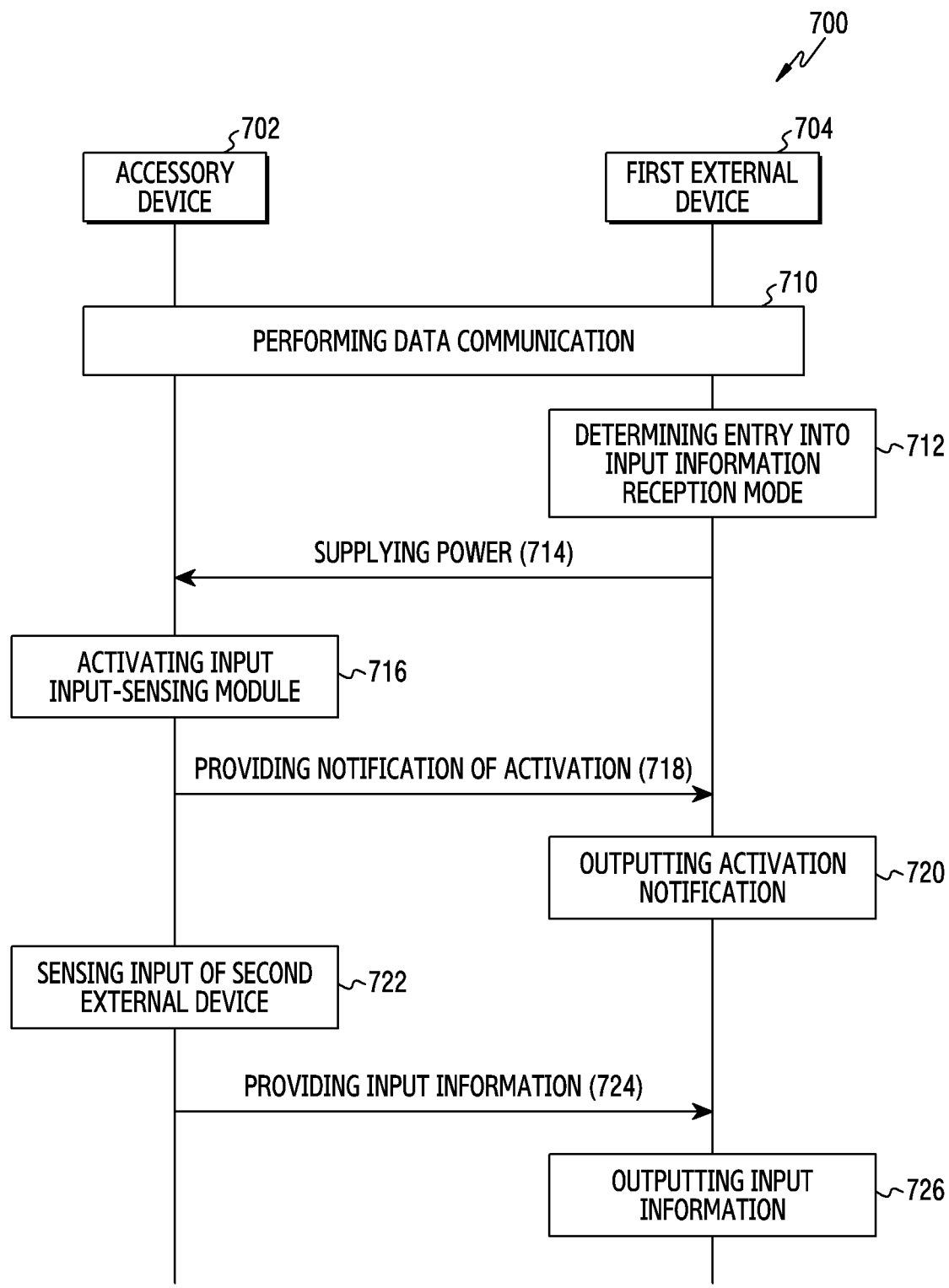
FIG. 7 is a view illustrating a procedure of operating an accessory device and an external device according to certain embodiments.

FIG. 7 is a view illustrating a procedure of operating an accessory device and an external device (700), according to certain embodiments.

Referring to FIG. 7, in operation 710, an accessory device 702 (e.g., the accessory device 200) and a first external device 704 (e.g., the first external device 101) are engaged with (or coupled to) each other, and may thus perform data communication with each other. According to an embodiment, when the first external device 704 and the accessory device 702 are engaged with each other, the first external device 704 may perform data communication while supplying first power to the accessory device 702. As described above, through the data communication, the first external device 704 may transmit and receive set information, event information, operation completion information, or the like, or may perform authentication on the accessory device 702. However, this is merely an example, and embodiments are not limited thereto. For example, operation 710 may be omitted, among operations between the accessory device and the external device.

In operation 712, the first external device 704 may determine that entry into the input information reception mode is to be performed. The input information reception mode may be a mode for receiving input information provided from the accessory device 702. According to an embodiment, when detecting the user's handwriting situation, the first external device 704 may determine that conditions for entry into the input information reception mode are satisfied. For example, the user's handwriting situation may include a state in which the first cover portion 210 and the second cover portion 220 of the accessory device 702 are unfolded, and a state in which the second external device 270 inserted into the first external device 704 is drawn out from the first external device 704. In this embodiment, the configuration in which entry into the input information reception mode is determined by the first external device 704 has been described. However, as described above, the determination may also be made by the accessory device 702.

In operation 714, the first external device 704 may initiate supplying power to the engaged accessory device 702. According to an embodiment, when it is determined that entry into the input information reception mode is performed, the first external device 704 may supply second power to the accessory device 702.

In operation 716, the accessory device 702 may operate in the handwriting input mode by activating the input-sensing module 330. According to an embodiment, the accessory device 702 may supply at least some of the power supplied from the first external device 704 to the input-sensing module 330 in response to detection of the activation event.

In operation 718, the accessory device 702 may notify the first external device 704 that the input-sensing module 330 is activated.

In operation 720, the first external device 704 may output a message indicating that handwriting input is now possible via the accessory device 702. For example, the first external device 704 may output an activation notification message in the form of a popup via the display device 160. However, this is merely an example, and certain embodiments are applicable without being limited thereto. For example, the first external device 704 may output an activation notification using at least one of audio, vibration, and light emission.

In operation 722, the accessory device 702 may sense input via the second external device 270 while operating in the handwriting input mode.

In operation 724, the accessory device 702 may provide information (or a signal) related to the sensed input via the second external device 270 to the first external device 704. For example, the information related to the input provided to the first external device 704 may include information related to the position and intensity of a magnetic field sensed by the input-sensing module 330 of the activated accessory device 702.

In operation 726, the first external device 704 may output, via the display device 160, the input information of the second external device 270 sensed via the accessory device 702.

Figure 8:
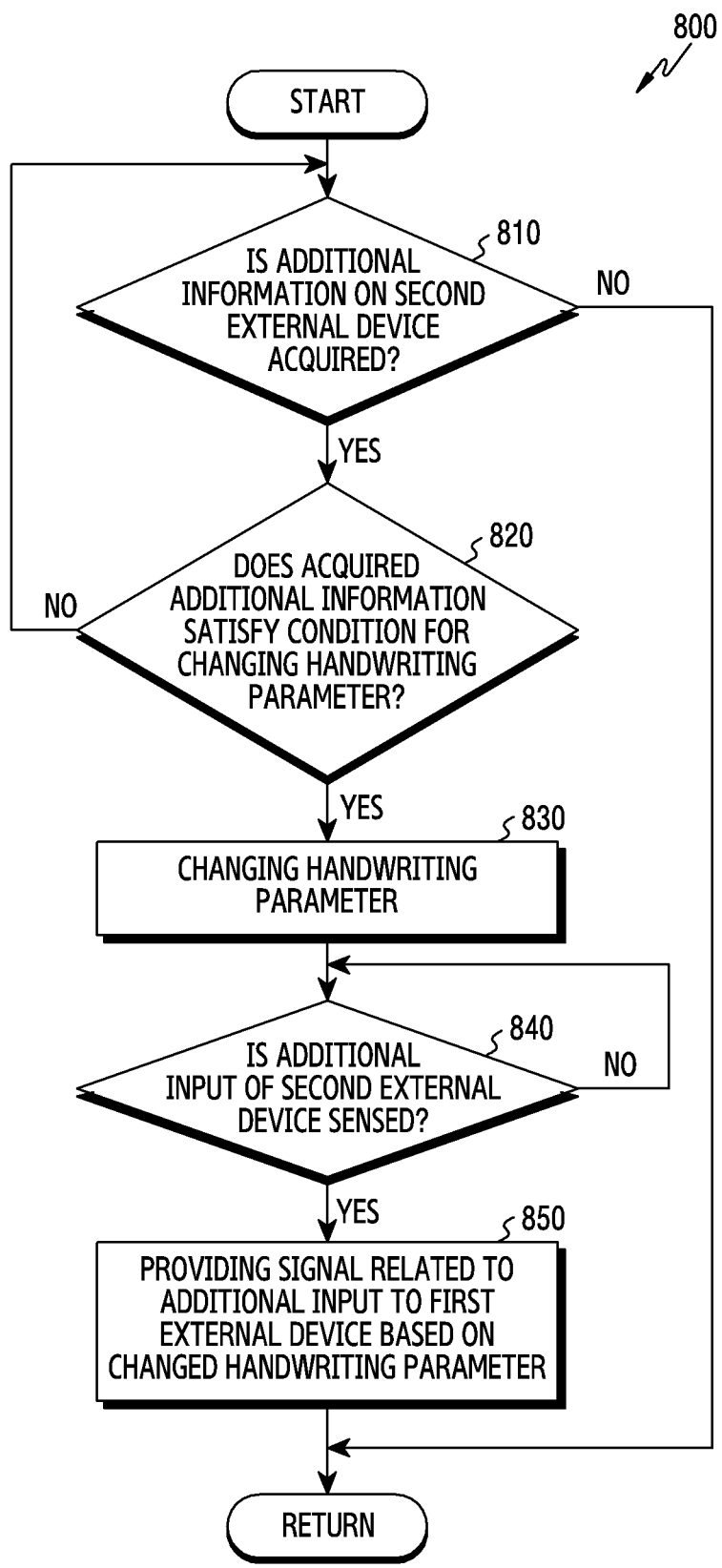
FIG. 8 is a flowchart for providing a handwriting input mode in an accessory device according to certain embodiments.
Figure 9A:
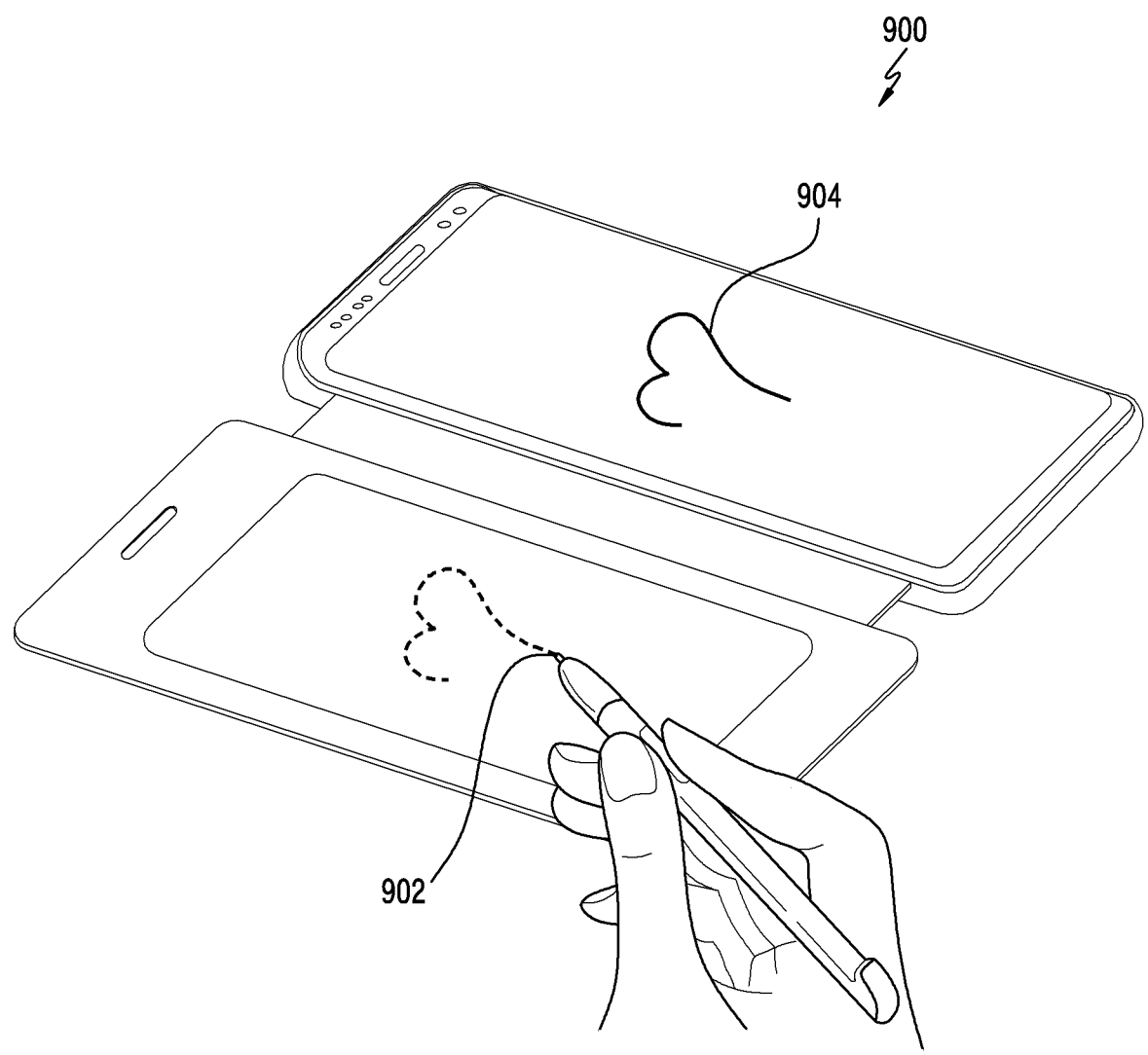
FIG. 9A is a view for describing a situation in which a handwriting parameter is changed based on additional information of a second external device according to an example embodiment.
Figure 9B:
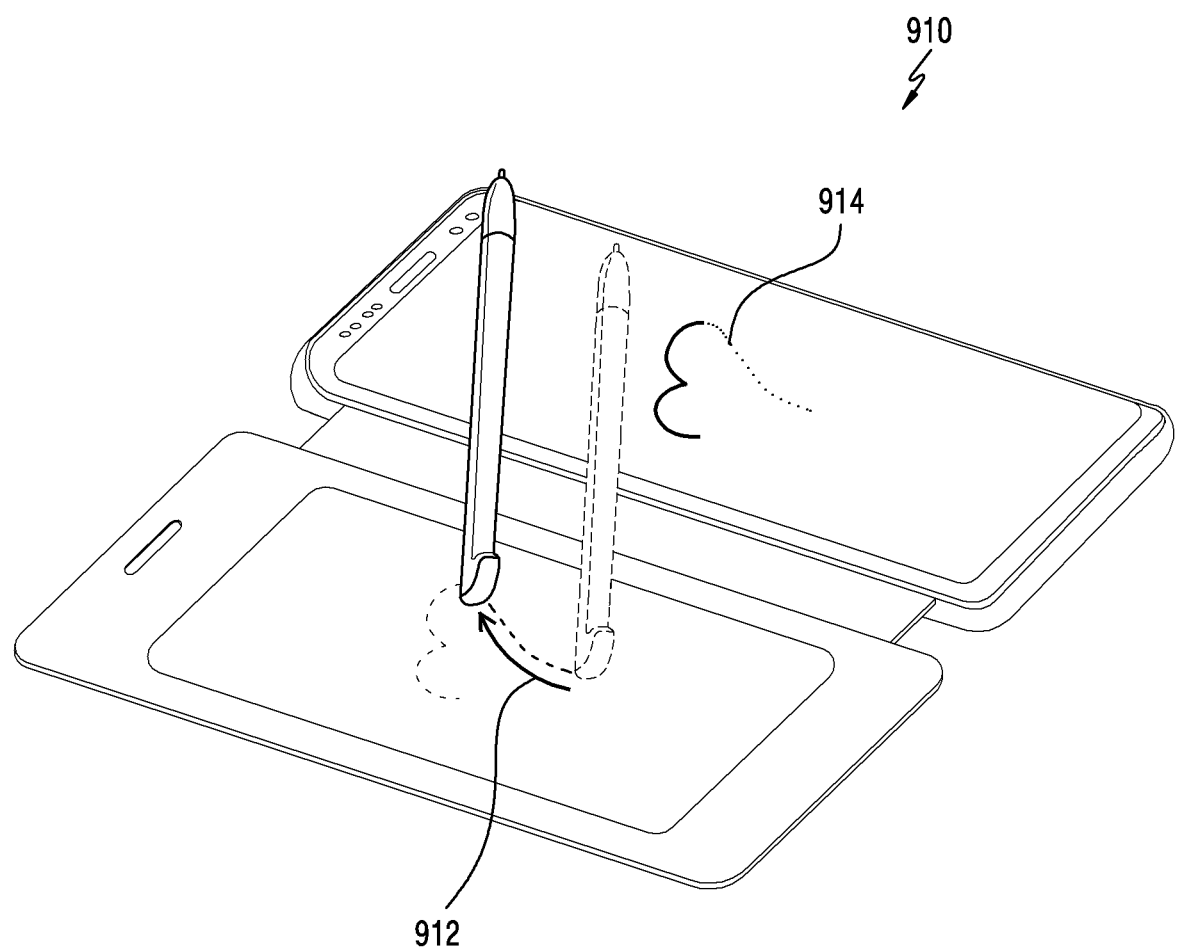
FIG. 9B is a view for describing a situation in which a handwriting parameter is changed based on additional information of a second external device according to an example embodiment.
Figure 10A:
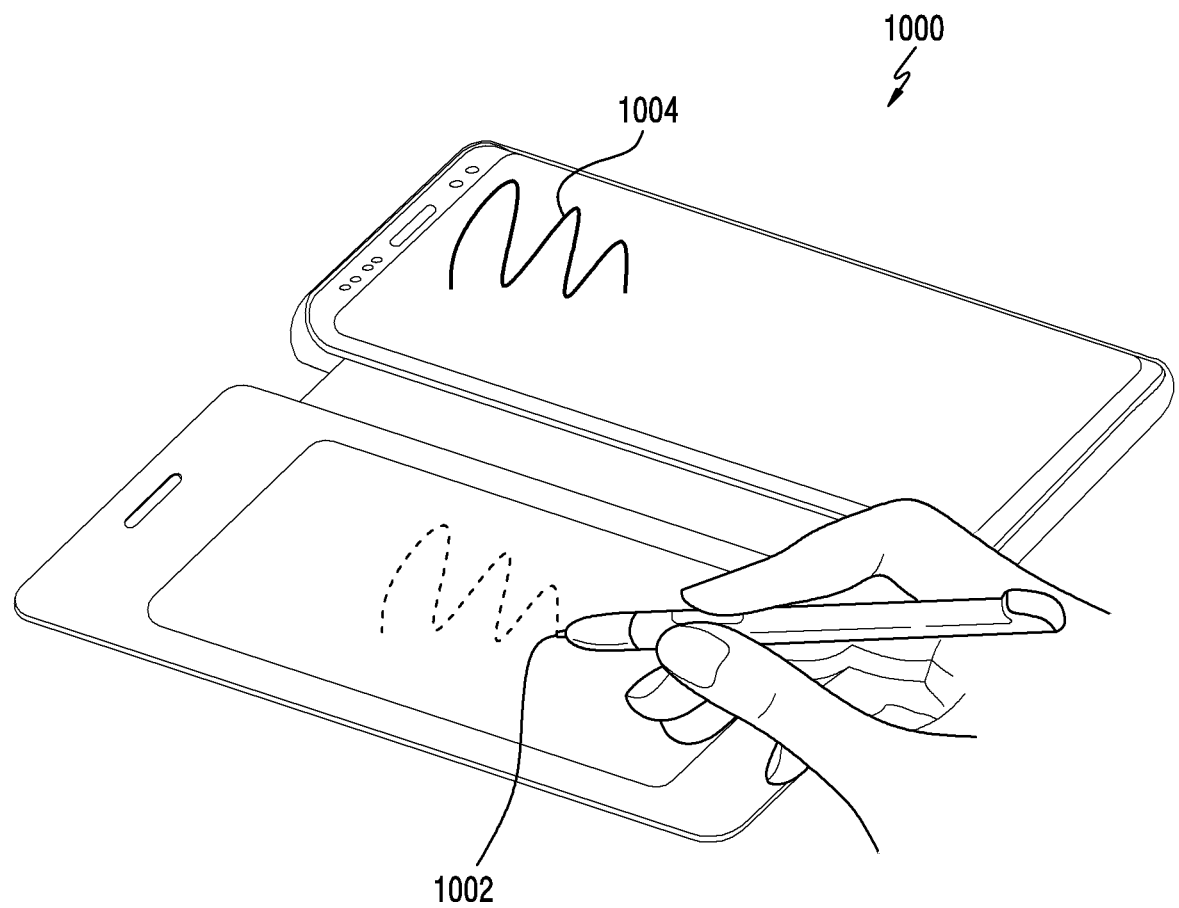
FIG. 10A is a view for describing a situation in which a handwriting parameter is changed based on additional information of a second external device according to another example embodiment.
Figure 10B:
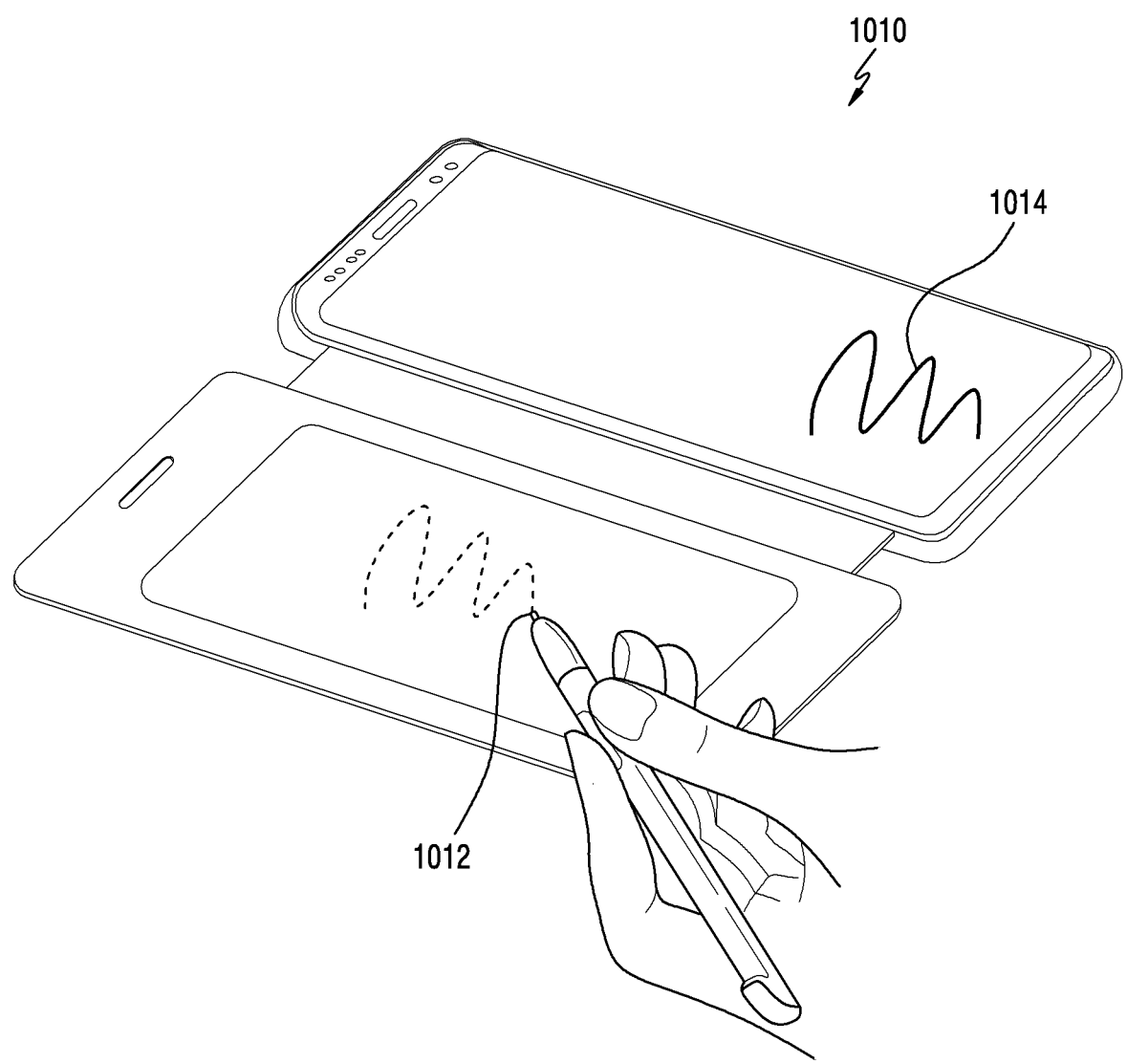
FIG. 10B is a view for describing a situation in which a handwriting parameter is changed based on additional information of a second external device according to another example embodiment.

FIG. 8 is a flowchart for controlling a handwriting input mode in an accessory device (800) according to certain embodiments. FIG. 9A is a view for describing a situation in which a handwriting parameter is changed based on additional information of a second external device according to an example embodiment, and FIG. 9B is a view for describing a situation in which a handwriting parameter is changed based on additional information of a second external device according to an example embodiment. FIG. 10A is a view for describing a situation in which a handwriting parameter is changed based on additional information of a second external device according to another example embodiment, and FIG. 10B is a view for describing a situation in which a handwriting parameter is changed based on additional information of a second external device according to another example embodiment. The operations of FIG. 8 described below may correspond to certain embodiments of operation 430 and operation 440 in FIG. 4. In the following embodiments, respective operations may be performed sequentially, but are not necessarily performed sequentially. For example, the order of respective operations may be changed, and at least two operations may be performed in parallel.

Referring to FIG. 8, according to certain embodiments, the accessory device 200 (e.g., the control module 322 in FIGS. 3A and 3B) may acquire information on the second external device 270 in operation 810. The additional information may be associated with at least one of orientation (e.g., tilt) information and motion (e.g., speed or direction) information of the second external device 270. For example, the control module 322 may receive additional information from the first external device 101 or the second external device 270. However, this is merely an example, and the embodiments are not limited thereto. For example, the control module 322 may acquire additional information using at least one sensor provided in the accessory device 200.

If the additional information is acquired, then according to certain embodiments, in operation 820, the accessory device 200 (e.g., the control module 322 in FIGS. 3A and 3B) may determine whether or not the additional information satisfies a condition for changing a handwriting parameter. The handwriting parameter may include at least one of a thickness, a type, and a color of a line corresponding to the input via the second external device 270. In addition, the handwriting parameter may include at least one handwriting mode (e.g., a drawing mode, an erasing mode, an input cancel mode, or an input repeat mode).

According to certain embodiments, when the acquired additional information does not satisfy the condition for changing the handwriting parameter, the accessory device 200 (e.g., the control module 322 in FIGS. 3A and 3B) may repeatedly perform an operation of determining whether not a handwriting parameter is changed. For example, the control module 322 may perform operations related to operations 810 and 820.

According to certain embodiments, when the acquired additional information satisfies the condition for changing the handwriting parameter, the accessory device 200 (e.g., the control module 322 in FIGS. 3A and 3B) may change a parameter corresponding to the acquired additional information in operation 830.

According to certain embodiments, in operation 840, the accessory device 200 (e.g., the control module 322 in FIGS. 3A and 3B) may determine whether or not additional input through the second external device 270 is sensed. According to an embodiment, the control module 322 may sense a magnetic field generated by the second external device 270 in the state in which the parameter is changed.

According to certain embodiments, when the additional input via the second external device 270 is not sensed, the accessory device 200 (e.g., the control module 322 in FIGS. 3A and 3B) may repeat the operation of sensing information on the second external device 270.

According to certain embodiments, when the additional input via the second external device 270 is sensed, in operation 850, the accessory device 200 (e.g., the control module 322 in FIGS. 3A and 3B) may provide a signal related to the additional input to the first external device 101 based on the changed parameter.

For example, as illustrated in FIG. 9A, the control module 322 performs a process such that a drawing mode may be executed (900), in which the position change (902) of a magnetic field generated by the second external device 270 is expressed as a line (904). In addition, as illustrated in FIG. 9B, when the control module 322 acquires, from the second external device 270, additional information indicating that the orientation of the second external device 270 is changed to a predetermined orientation (e.g., rotated), the control module 322 may perform a process such that an erasing mode, in which the previously drawn line is deleted (914) in response to the position change (912) of the magnetic field generated by the second external device, is executed (910).

According to certain embodiments, when the orientation of the second external device 270 is changed (e.g., rotated), the magnetic field input to the input-sensing module 212 may be changed. The first external device 101 may determine whether to perform the drawing mode or the erasing mode based on the changed magnetic field in the input-sensing module 212, and may output an operation screen corresponding to the mode state and position change (912) on the display device 160.

As another example, as illustrated in FIG. 10A, when information indicating a first holding state (e.g., a state of being held in a right hand) is received from the first external device 101 or the second external device 270, the control module 322 may perform a process such that a line indicating the position change (1002) of the magnetic field generated by the second external device 270 is displayed (1004) at a first position (e.g., a first position on the display device) of the first external device 101 (1000). In addition, as illustrated in FIG. 10B, when information indicating a second holding state (e.g., a state of being held in a left hand) is received from the first external device 101 or the second external device 270, the control module 322 may perform a process such that a line indicating the position change (1012) of the magnetic field generated by the second external device 270 is displayed (1014) at a second position (e.g., a second position on the display device) of the first external device 101 (1010).

Figure 11:
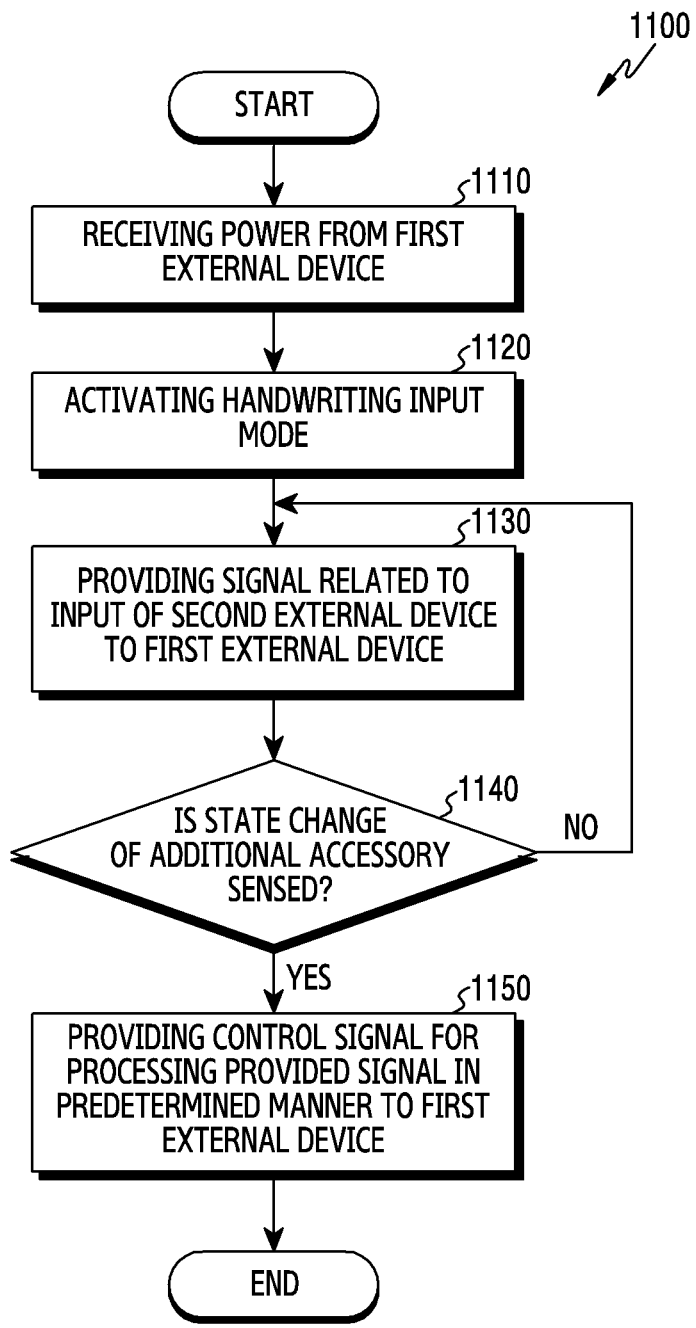
FIG. 11 is another flowchart for providing a handwriting input function in an accessory device according to certain embodiments.
Figure 12A:
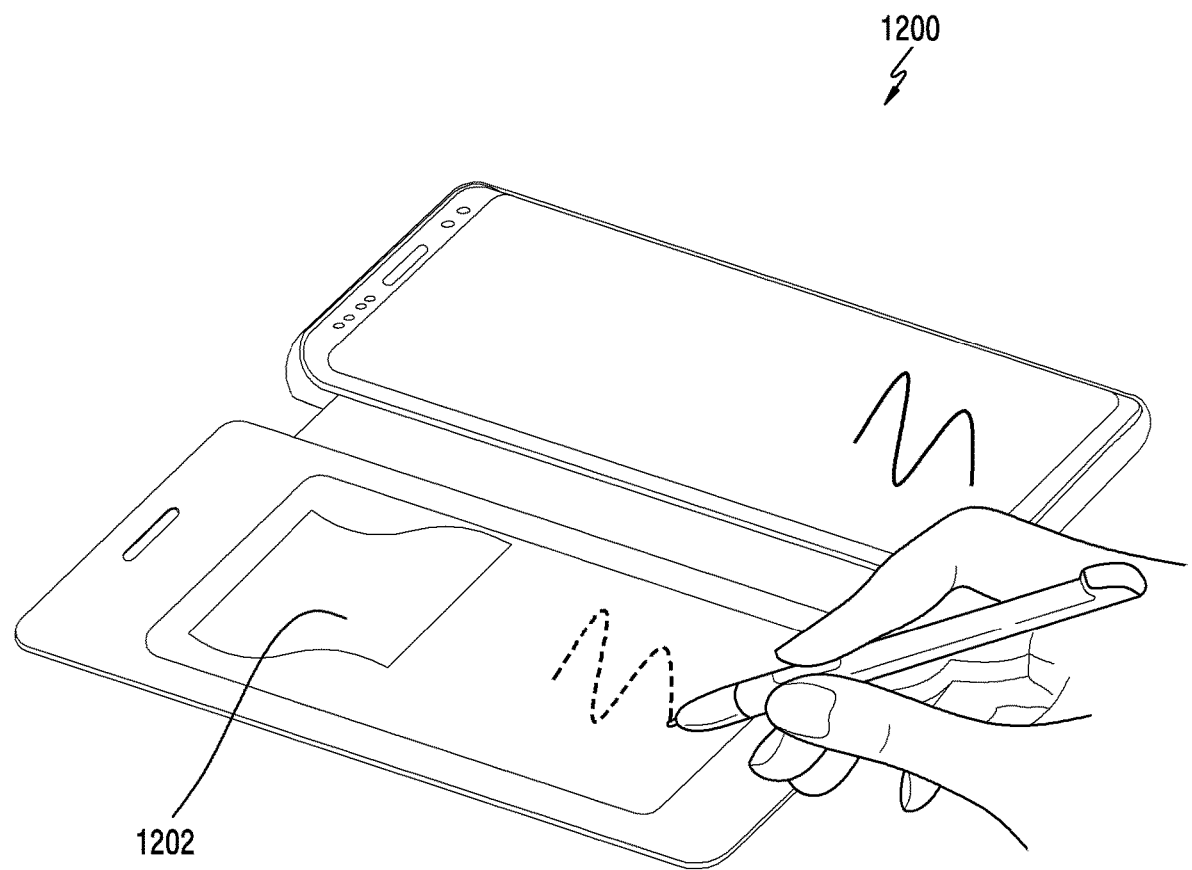
FIG. 12A is a view for describing a situation in which a handwriting input mode is controlled based on an additional accessory according to an embodiment.
Figure 12B:
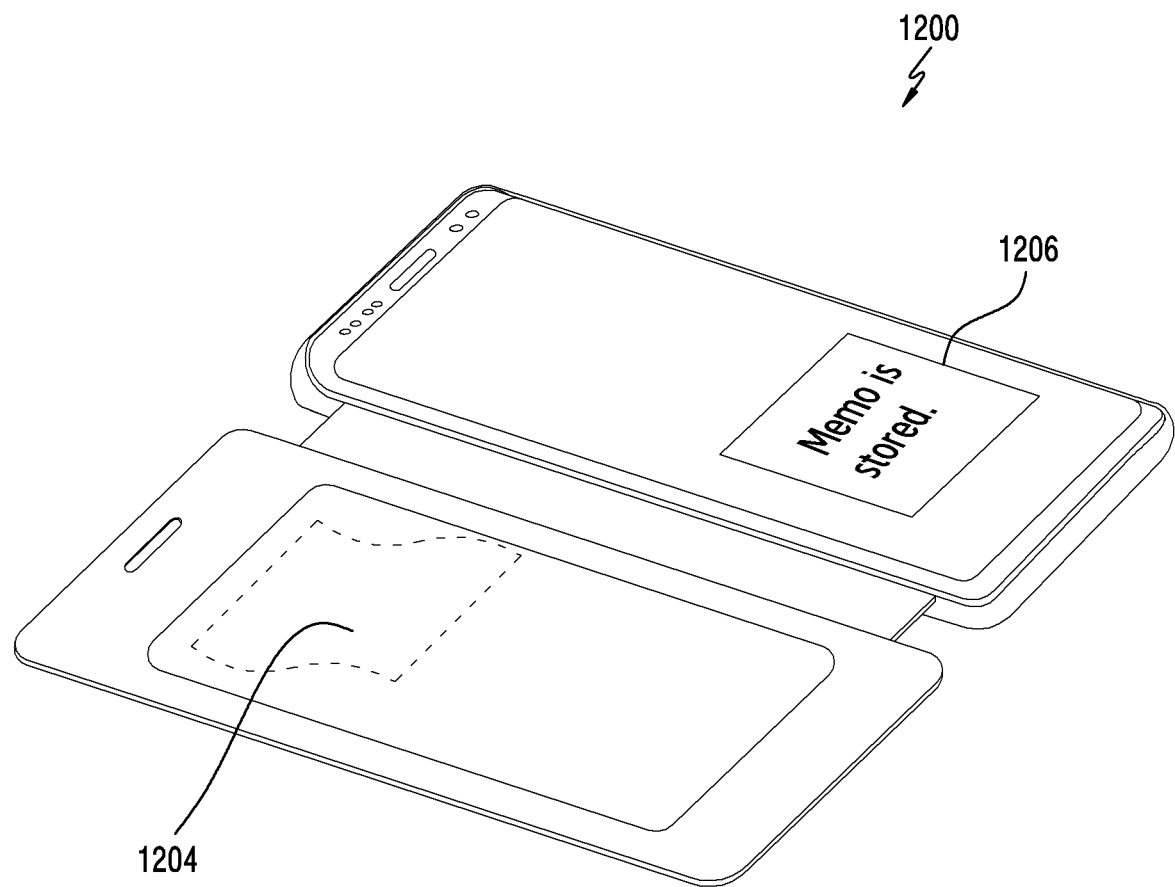
FIG. 12B is a view for describing a situation in which a handwriting input mode is controlled based on an additional accessory according to an embodiment.
Figure 12C:
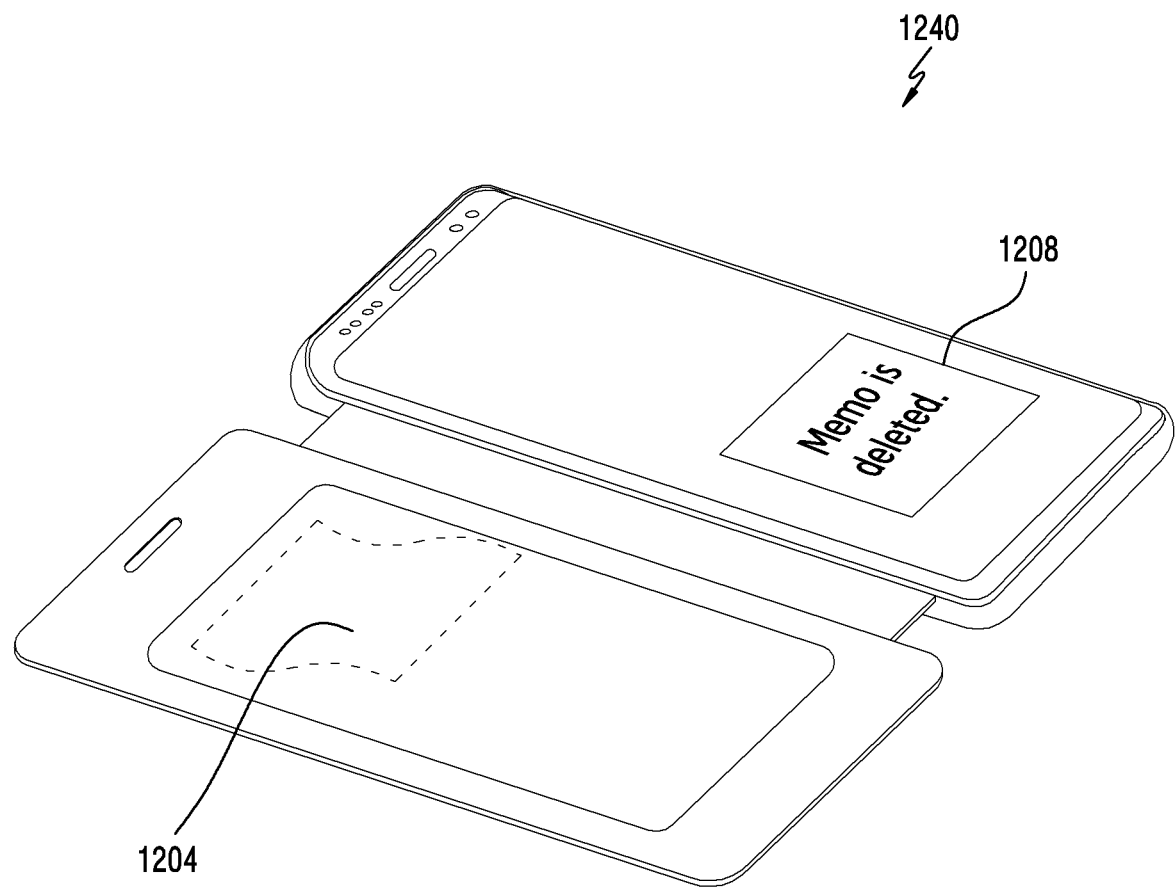
FIG. 12C is a view for describing a situation in which a handwriting input mode is controlled based on an additional accessory according to an embodiment.

FIG. 11 is another flowchart for providing a handwriting input function in an accessory device (1100) according to certain embodiments. FIG. 12A is a view for describing a situation in which a handwriting input mode is controlled based on an additional accessory according to an embodiment, FIG. 12B is a view for describing a situation in which a handwriting input mode is controlled based on an additional accessory according to an embodiment, and FIG. 12C is a view for describing a situation in which a handwriting input mode is controlled based on an additional accessory according to an embodiment. The operations of FIG. 8 described below may correspond to certain embodiments of operation 430 and operation 440 in FIG. 4. In the following embodiments, respective operations may be performed sequentially, but are not necessarily performed sequentially. For example, the order of respective operations may be changed, and at least two operations may be performed in parallel.

Referring to FIG. 11, according to certain embodiments, the accessory device 200 (e.g., the control module 322 in FIGS. 3A and 3B) may receive power from a first external device 101 (e.g., the electronic device 101) in operation 1110. According to an embodiment, as described above, the control module 322 may receive power using NFC communication in the state in which the accessory device 200 is engaged with the first external device 101.

According to certain embodiments, in operation 1120, the accessory device 200 (e.g., the control module 322 in FIGS. 3A and 3B) may activate the handwriting input mode. The handwriting input mode may be a mode in which input to the second external device 270 is sensed using the accessory device 200 engaged with the first external device 101 and the sensed input through the first external device 101 is stored or output through the first external device 101.

According to certain embodiments, in operation 1130, the accessory device 200 (e.g., the control module 322 in FIGS. 3A and 3B) may provide a signal related to the input via the second external device 270 to the first external device 101. According to an embodiment, the control module 322 may sense a magnetic field generated by the second external device 270 via the accessory device 200 (e.g., the input-sensing module 330), and may transmit at least one of information related to the position of the sensed magnetic field and information related to the intensity of the sensed magnetic field to the first external device 101.

According to certain embodiments, in operation 1140, the accessory device 200 (e.g., the control module 322 in FIGS. 3A and 3B) may sense a state change of an additional accessory. The additional accessory may include an adhesive sheet (e.g., a memo pad or a sticker) that may be used in the state of being attached to at least a portion of the accessory device 200. However, this is merely an example, and certain embodiments are applicable without being limited thereto. For example, the additional accessory may be in a form (e.g., a doll) that is capable of being coupled to the accessory device 200 using an annular connection member.

According to an embodiment, at least a portion of the additional accessory may include a component for changing an electrical parameter (e.g., an inductance component), and the accessory device 200 may determine the state change of the additional accessory (e.g., whether it is mounted or detached) using a detection member configured to detect the inductance component. According to another embodiment, at least a portion of the additional accessory may include a component for changing a magnetic field component (e.g., a magnetic component), and the accessory device 200 may determine the state change of the additional accessory using a detection member configured to detect the magnetic field component. According to another embodiment, a portion of the additional accessory may include at least one sensor, and the accessory device 200 may determine the state change of the additional accessory using a detection member provided at a position corresponding to the sensor of the additional accessory. However, this is merely an example, and certain embodiments are applicable without being limited thereto. For example, the accessory device 200 may determine the state change of the accessory based on a predefined input (e.g., a sensor input, a touch input, a button input, a voice input, or a gesture input).

According to certain embodiments, in operation 1150, the accessory device 200 (e.g., the control module 322 in FIGS. 3A and 3B) may provide a control signal for processing a signal provided to the first external device 101.

For example, as illustrated in FIG. 12A, the accessory device 200 may provide, to the first external device 101, a signal related to input via the second external device, sensed in a first state (e.g., a mounted state) of the additional accessory (1202), and the first external device 101 may output input information of the second external device 270, sensed via the accessory device 200 based on the received signal, via the display device 160 (1200).

In addition, as illustrated in FIG. 12B, when sensing a second state (e.g., a detached state) (1204) of the additional accessory (1202), the accessory device 200 may provide, to the first external device 101, a signal that instructs the first external device 101 to process input information, and the first external device 101 may perform a process to store the input information output to the display device 206 on the basis of the received signal (1210). In this case, the first external device 101 may output a message, indicating that the output input information is stored, via the display device 206 (1206). In this embodiment, an embodiment in which the input information is stored based on the state change of the additional accessory 1202 has been described. However, this is merely an example, and embodiments are not limited thereto. For example, as illustrated in FIG. 12C, when sensing the second state (e.g., the detached state) of the additional accessory (1202), the accessory device 200 may process the input information output to the display device 206 such that outputting of the input information is stopped (e.g., deletion) (1240), or may process the input information in various manners, such as updating the input via the second external device on the display device (e.g., newly correcting), displaying the input via the second external device on a new screen, or copying the input information output to the display. In this case, the first external device 101 may output a message indicating the method of processing the output input information via the display device 206 (1208).

In this embodiment, the state change of the additional accessory 1202 has been described as detaching and attaching of the additional accessory. However, this is merely an example, and embodiments are not limited thereto. For example, the accessory device 200 may determine the proximity, touch, touch movement, and the like of the additional accessory 1202 to be the state change.

Figure 13:
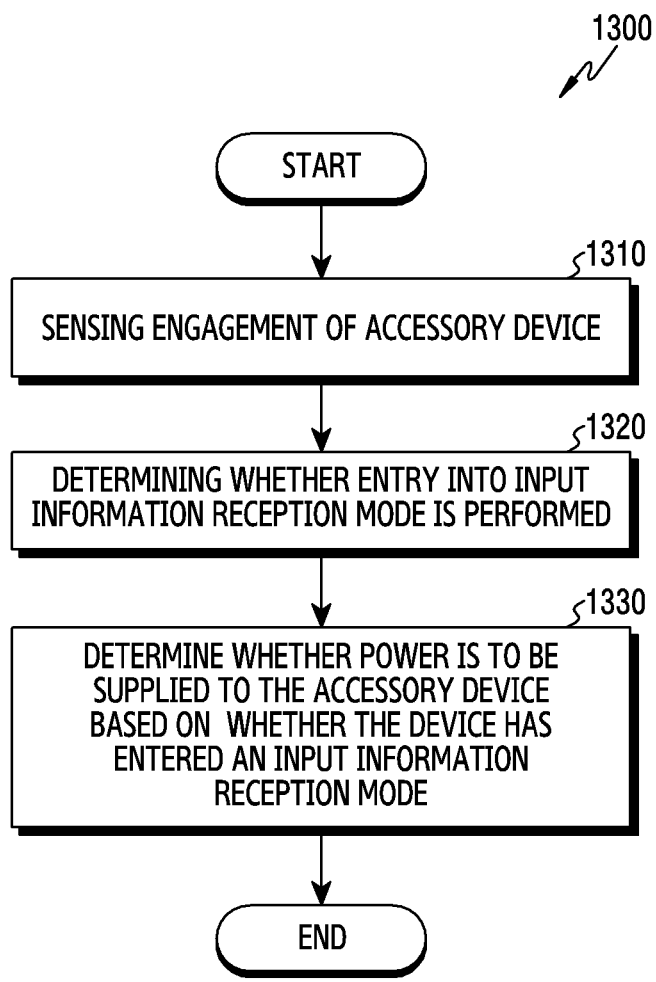
FIG. 13 is a flowchart for providing a handwriting input function in a first external device according to certain embodiments.

FIG. 13 is a flowchart for providing a handwriting input function in a first external device (1300) according to certain embodiments. In the following embodiments, respective operations may be performed sequentially, but are not necessarily performed sequentially. For example, the order of respective operations may be changed, and at least two operations may be performed in parallel.

Referring to FIG. 13, according to certain embodiments, in operation 1310, the first external device 101 (e.g., the processor 120 in FIG. 1) may sense engagement with the accessory device 200. As described above, the engagement may mean that the second cover portion 220 of the accessory device 200 is engaged with the rear face of the first external device 101. According to an embodiment, the processor 120 may sense that the first external device 101 is engaged with the accessory device 200 based on at least some of signals sensed via the sensor module. For example, the processor 120 may determine that the first external device 101 is engaged with the accessory device 200 in response to sensing a signal related to proximity to the first external device 101 via the sensor module 304. According to certain embodiments, the processor 120 may supply first power to the accessory device 200 to drive the accessory device 200 in response to sensing the engagement with the accessory device 200.

According to certain embodiments, in operation 1320, the first external device 101 (e.g., the processor 120 in FIG. 1) may determine whether or not entry into the input information reception mode is to be performed. As described above with reference to FIG. 3A, the input information reception mode may be a mode for receiving input information provided from the accessory device 101. According to an embodiment, when detecting the user's handwriting situation, the processor 120 may determine that conditions for entry into the input information reception mode are satisfied. The user's handwriting situation may include a state in which the first cover portion 210 and the second cover portion 220 of the accessory device 200 are unfolded, and a state in which the second external device 270 inserted into the first external device 101 is drawn out from the first external device 101.

According to certain embodiments, in operation 1330, the first external device 101 (e.g., the processor 120 in FIG. 1) may determine whether to supply power to the accessory device 200 based on whether or not entry into the input information reception mode is performed. For example, the processor 120 may change the first power supplied to the accessory device 200 to the determined second power based on the determination of power.

Figure 14:
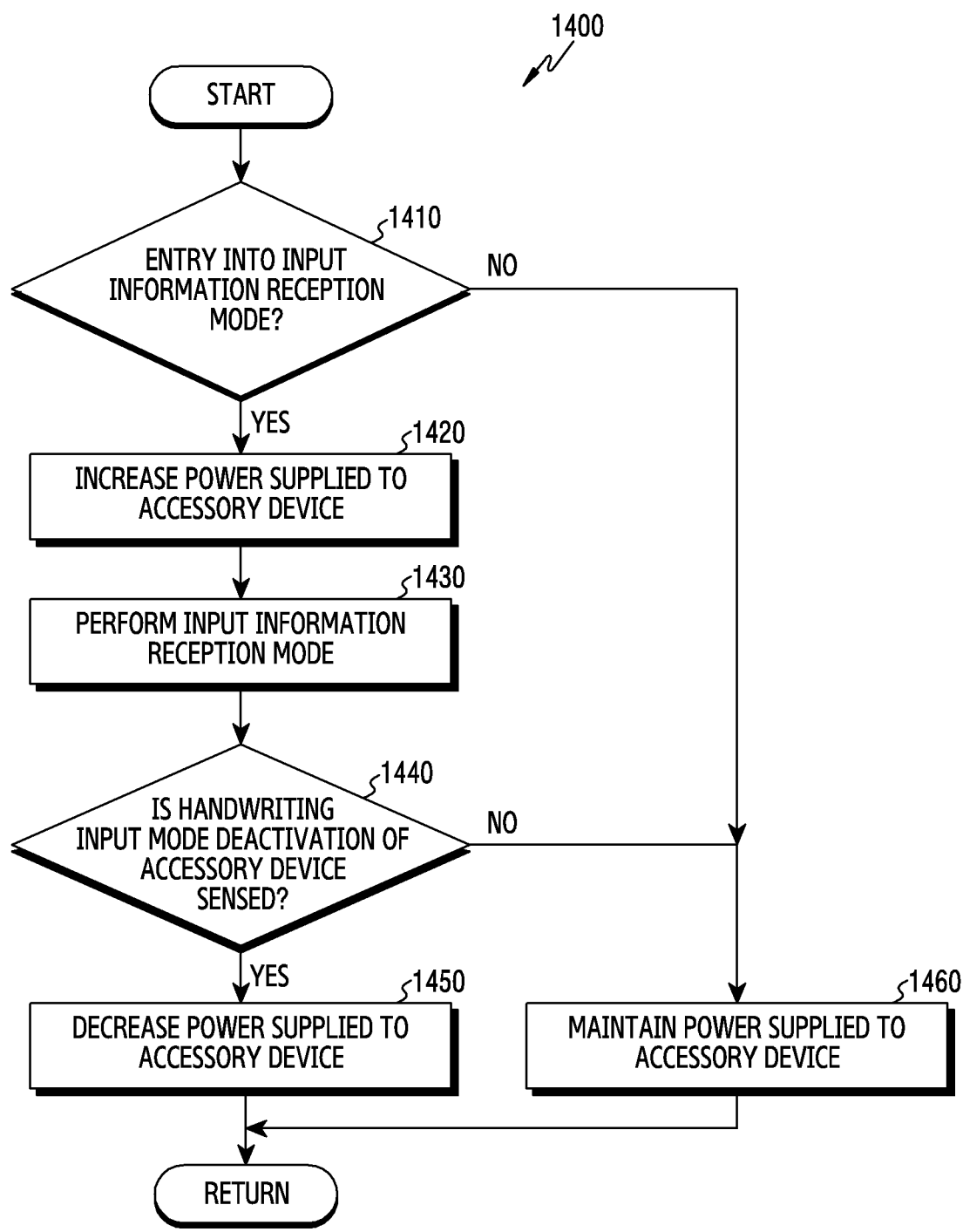
FIG. 14 is a flowchart for determining power supplied to an accessory device from a first external device according to certain embodiments.

FIG. 14 is a flowchart for determining power supplied to an accessory device from a first external device (1400) according to certain embodiments. The operations of FIG. 14 described below may correspond to certain embodiments of operation 1330 in FIG. 13. In the following embodiments, respective operations may be performed sequentially, but are not necessarily performed sequentially. For example, the order of respective operations may be changed, and at least two operations may be performed in parallel.

Referring to FIG. 14, according to certain embodiments, in operation 1410, the first external device 101 (e.g., the processor 120 in FIG. 1) may determine whether or not entry into the input information reception mode is performed.

According to certain embodiments, when it is not determined that entry into the input information reception mode is performed, in operation 1460, the first external device 101 (e.g., the processor 120 in FIG. 1) may maintain the power supplied to the accessory device 200. According to an embodiment, as described above with reference to state (1310) in FIG. 13, the processor 120 may supply the first power to the accessory device 200.

According to certain embodiments, when it is determined that entry into the input information reception mode is performed, in operation 1420, the first external device 101 (e.g., the processor 120 in FIG. 1) may increase the power supplied to the accessory device 200. For example, the processor 120 may supply second power, which is greater than the first power supplied to the accessory device 200, to the accessory device 200.

According to certain embodiments, in operation 1430, the first external device 101 (e.g., the processor 120 in FIG. 1) may operate in the input information reception mode. According to an embodiment, the processor 120 may output, via the display device 160, the input information of the second external device 270 sensed via the accessory device 200.

According to certain embodiments, in operation 1440, the first external device 101 (e.g., the processor 120 in FIG. 1) may determine whether or not a deactivation event of the accessory device is sensed. According to an embodiment, the deactivation event may be associated with the termination of the handwriting input mode. For example, the processor 120 may determine disengagement between the accessory device 200 and the first external device 101 as sensing of the deactivation event. As another example, when the accessory device 200 is switched from the opened state into the closed state, the processor 120 may determine this to be a deactivation event. As another example, when the second external device 270 is switched from the drawn-out state into the inserted or mounted state, the processor 120 may determine this to be a deactivation event.

According to certain embodiments, when no deactivation event is sensed, in operation 1460, the first external device 101 (e.g., the processor 120 in FIG. 1) may maintain the power supplied to the accessory device 200. According to an embodiment, the processor 120 may maintain the supply of the second power to the accessory device 200.

According to certain embodiments, when a deactivation event is sensed, in operation 1450, the first external device 101 (e.g., the processor 120 in FIG. 1) may reduce the power supplied to the accessory device 200. According to an embodiment, the processor 120 may supply the first power, which is less than the second power supplied to the accessory device 200, to the accessory device 200.

Figure 15:
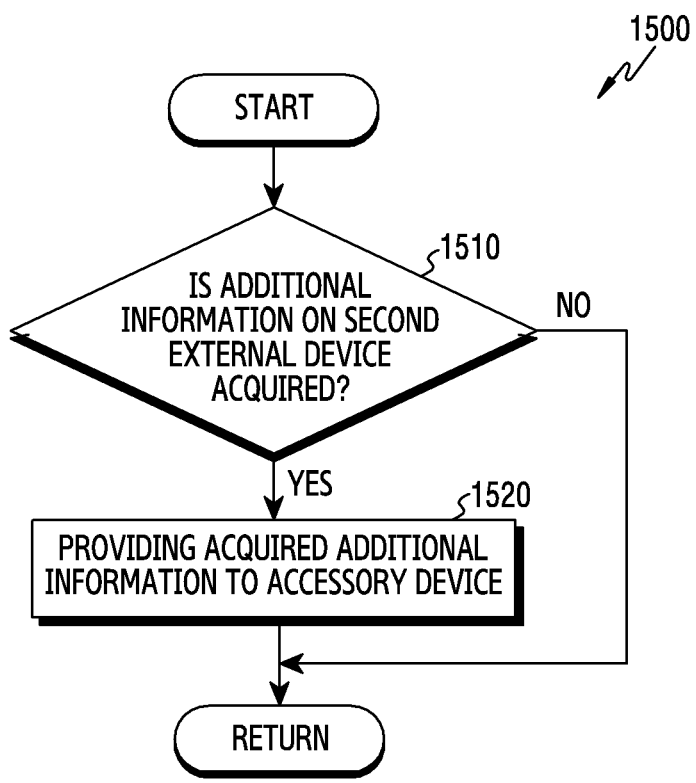
FIG. 15 is a flowchart for operating an input information reception mode in a first external device according to certain embodiments.

FIG. 15 is a flowchart for operating an input information reception mode in a first external device (1500) according to certain embodiments. The operations of FIG. 15 described below may correspond to certain embodiments of operation 1430 in FIG. 14. In the following embodiments, respective operations may be performed sequentially, but are not necessarily performed sequentially. For example, the order of respective operations may be changed, and at least two operations may be performed in parallel.

Referring to FIG. 15, according to certain embodiments, in operation 1510, the first external device 101 (e.g., the processor 120 in FIG. 1) may determine whether or not additional information on the second external device 270 is acquired. As described above, the additional information may be associated with at least one of orientation (e.g., tilt) information and motion (e.g., speed or direction) information of the second external device 270. In addition, the additional information may be used to determine whether or not a handwriting parameter of the second external device 270 is changed. According to an embodiment, the processor 120 may acquire additional information using at least one sensor provided in the first external device 101, or may receive additional information from the second external device 270.

According to certain embodiments, when the additional information is acquired, in operation 1520, the first external device 101 (e.g., the processor 120 in FIG. 1) may provide the acquired information to the accessory device 200. In this embodiment, the configuration in which the first external device 101 provides additional information to the accessory device 200 and the accessory device 200 determines whether or not a handwriting parameter is changed based on the received additional information has been described. However, this is merely an example, and certain embodiments are applicable without being limited thereto. For example, the first external device 101 may determine whether or not a handwriting parameter is changed based on the acquired additional information, and when a condition for changing the handwriting parameter is satisfied, the first external device 101 may provide the accessory device 200 with information that instructs the accessory device 200 to change the handwriting parameter.

A method of operating an electronic device (e.g., the accessory device 200) according to certain embodiments may include: an operation of receiving power from an engaged first external device; an operation of driving an input-sensing circuit of an accessory device based on at least a part of the received power; an operation of sensing input of a second external device using the driven input-sensing circuit; and an operation of transmitting a signal related to the sensed input via the second external device to the engaged first external device.

According to an embodiment, the electronic device operating method may further include an operation of driving the input-sensing circuit of the accessory device based on at least one of an opened state of the accessory device or a drawn-out state of the second external device.

According to an embodiment, the electronic device operating method may further include: an operation of identifying the drawing-out of the second external device inserted into the accessory device.

According to an embodiment, the electronic device operating method may further include an operation of identifying the drawing-out of the second external device inserted into the first external device.

According to an embodiment, the operation of sensing the input via the second external device using the driven input-sensing circuit includes an operation of acquiring additional information related to the second external device and an operation of changing a handwriting parameter based on the acquired additional information, and the handwriting parameter may include at least one of a drawing mode, an erasing mode, an input cancel mode, or an input repeat mode.

According to an embodiment, the operation of sensing the input via the second external device using the driven input-sensing circuit may include an operation of stopping the supply of power to the input-sensing circuit in response to sensing a deactivation event for the input-sensing circuit. The deactivation event may include at least one of disengagement from the external device, closing of the accessory device, or insertion of the second external device.

According to an embodiment, the operation of driving the input-sensing circuit of the accessory device may include an operation of notifying the first external device of activation of the input-sensing module.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
a housing including a first cover portion adapted to couple to a first face of a first external device, a second cover portion adapted to couple to a second face of the first external device, and a third cover portion adapted to surround at least a portion of a side face of the first external device, wherein the third cover portion connects the first cover portion and the second cover portion;
an antenna housed in the second cover portion;
a power management circuit configured to receive power via the antenna;
a wireless communication circuit configured to provide wireless communication using the antenna;
an input-sensing circuit disposed in the first cover portion and configured to detect an input of digital pen based on the power supplied from the power management circuit, and to generate a signal related to the input of the digital pen in response to the detection of the input;
a control circuit disposed in the housing and operatively connected to the power management circuit, the wireless communication circuit, and the input-sensing circuit; and
a sensing member configured to detect the digital pen's desorption,
wherein the control circuit is configured to detect the input of the digital pen through the input-sensing circuit and to transmit the signal related to the input of the digital pen to the first external device using the wireless communication circuit.

2. The electronic device of claim 1, wherein the digital pen is stowable within the first external device,
wherein the housing of the electronic device is foldable onto a surface of the first external device to transition the electronic device between an open state to a closed state, and
wherein the control circuit is configured to supply power received from the first external device to the input-sensing circuit based on at least one of the open state of the electronic device or an unstowed state of the second external device.

3. The electronic device of claim 2, further comprising:
an accommodation groove defined in the housing for detachably stowing the digital pen therein,
wherein the accommodation groove operatively coupled with the sensing member,
wherein the control circuit is configured to identify removal of the digital pen from the accommodation groove based on at least a signal acquired via the at least one sensing circuit.

4. The electronic device of claim 2, wherein the control circuit is configured to identify removal of the digital pen based on at least one signals acquired via the first external device.

5. The electronic device of claim 1, wherein the control circuit is configured to:
acquire additional information related to the digital pen while transmitting a signal related to the input of the digital pen to the first external device, and
change a handwriting parameter based on the acquired additional information,
wherein the handwriting parameter includes at least one of a drawing mode, an erasing mode, an input cancel mode, and an input repeat mode.

6. The electronic device of claim 2, wherein the control circuit is configured to terminate a supply of power to the input-sensing circuit in response to detected a deactivation event for the input-sensing circuit,
wherein the deactivation event includes at least one of decoupling of the electronic device from the first external device, closing of the first and/or second cover portion of the housing, and insertion of the digital pen into the first external device.

7. The electronic device of claim 2, wherein the control circuit is configured to transmit a notification to the first external device indicating activation of the input-sensing circuit after supplying the power received from the first external device to the input-sensing circuit.

8. The electronic device of claim 7, wherein the control circuit is configured to transmit to the first external device a request to lower an amount of the received power to a predetermined level in response to sensing a deactivation event for the input-sensing circuit.

9. The electronic device of claim 1, wherein the control circuit is configured to:
detect a state change for an accessory related to the electronic device after transmitting a signal related to the digital pen to the first external device; and
transmit a processing signal for processing the transmitted signal in a predetermined manner to the first external device based on the state change.

10. The electronic device of claim 9, wherein the accessory includes an inductance component for changing an electrical parameter,
wherein the electronic device further comprises detection circuitry configured to detect the inductance component.

11. The electronic device of claim 9, wherein the accessory includes a magnetic component that generates a magnetic field, and
wherein the electronic device further comprises a detection member configured to detect the magnetic field.

12. The electronic device of claim 9, wherein the accessory includes an adhesive sheet.

13. A method in an electronic device, the method comprising:
receiving power from a first external device via an antenna included in a housing of the electronic device, wherein the housing includes a first cover portion adapted to couple to a first face of the first external device, a second cover portion adapted to couple to a second face of the first external device including the antenna, and a third cover portion adapted to surround at least a portion of a side face of the first external device, wherein the third cover portion connects the first cover portion and the second cover portion;
driving, by a processor, an input-sensing circuit of the electronic device based on at least a part of the received power;
detecting a desorption of a digital pen using a sensing member included in the electronic device;
detecting, by the input-sensing circuit, an input of the digital pen based on the power supplied from the first external device;
generating a signal related to the input of the digital pen in response to the detection of the input; and
transmitting, by a wireless communication circuit of the electronic device, a signal related to the input of the digital pen to the first external device.

14. The method of claim 13, wherein the digital pen is stowable within the first external device, and
wherein the housing of the electronic device is foldable onto a surface of the first external device to transition the electronic device between an open state to a closed state,
the method further comprising supplying power received from the first external device to the input-sensing circuit based on at least one of the open state of the electronic device or an unstowed state of the digital pen.

15. The method of claim 14, wherein the housing of the electronic device defines an accommodation groove defined for detachably stowing the digital pen therein, the method further comprising identifying removal of the digital pen from the accommodation groove based on at least a signal acquired via the sensing member.

16. The method of claim 14, further comprising identifying removal of the digital pen based on at least one signals acquired via the first external device.

17. The method of claim 13, wherein the detecting the input of the digital pen using the driven input-sensing circuit further includes:
acquiring additional information related to the digital pen; and
changing a handwriting parameter based on the acquired additional information,
wherein the handwriting parameter includes at least one of a drawing mode, an erasing mode, an input cancel mode, and an input repeat mode.

18. The method of claim 14, wherein the detecting of the input of the digital pen using the driven input-sensing circuit includes:
terminating a supply of power to the input-sensing circuit in response to detected a deactivation event for the input-sensing circuit,
wherein the deactivation event includes at least one of decoupling of the electronic device from the first external device, closing of the first and/or second cover portion of the housing, and insertion of the digital pen into the first external device.

19. The method of claim 14, wherein the driving of the input-sensing circuit of the electronic device includes transmitting a notification to the first external device indicating activation of the input-sensing circuit after supplying the power received from the first external device to the input-sensing circuit.

20. An electronic device, comprising:
a housing including a first face, a second face, and a third face surrounding a side face of another electronic device;
an antenna disposed adjacent to the second face of the housing;

a power management circuit configured to control power supplied to the another electronic device via the antenna;

wherein the another electronic device include an input-sensing circuit configured to detect an input from a digital pen and to generate data related to the input of the digital pen in response to the detection of the input;

a wireless communication circuit configured to communicate with the another electronic device using the antenna; and a control circuit disposed in the housing and operatively connected to the power management circuit and the wireless communication circuit;

wherein the control circuit is configured to:

determine whether or not the data is received via the wireless communication circuit indicating detecting of the digital pen's input by the another electronic device, and determine whether power is to be supplied to the another device using the power management circuit based on the determination.

\* \* \* \* \*